(12) United States Patent
Nakamura et al.

(10) Patent No.: US 11,954,312 B2
(45) Date of Patent: Apr. 9, 2024

(54) INPUT DEVICE ADAPTED TO RECEIVE A TOUCH INPUT AND A HOVER INPUT

(71) Applicant: ALPS ALPINE CO., LTD., Tokyo (JP)

(72) Inventors: Toshiki Nakamura, Miyagi (JP);
Hiroshi Shigetaka, Miyagi (JP);
Hirofumi Kuga, Miyagi (JP);
Masahiro Takata, Miyagi (JP); Yasuji Hagiwara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/804,388

(22) Filed: May 27, 2022

(65) Prior Publication Data

US 2022/0291814 A1 Sep. 15, 2022

Related U.S. Application Data

(63) Continuation of application No. PCT/JP2020/043060, filed on Nov. 18, 2020.

(30) Foreign Application Priority Data

Dec. 13, 2019 (JP) ................................. 2019-225803

(51) Int. Cl.
*G06F 3/04842* (2022.01)
*G06F 3/041* (2006.01)
*G06F 3/0488* (2022.01)

(52) U.S. Cl.
CPC ........ *G06F 3/04842* (2013.01); *G06F 3/0416* (2013.01); *G06F 3/0488* (2013.01); *G06F 2203/04806* (2013.01)

(58) Field of Classification Search
CPC .. G06F 3/04842; G06F 3/0416; G06F 3/0488; G06F 2203/04806; G06F 3/04182;
(Continued)

(56) References Cited

U.S. PATENT DOCUMENTS

2006/0071914 A1 4/2006 Kuroume et al.
2015/0052481 A1* 2/2015 Ronkainen .......... G06F 3/04886
715/815

(Continued)

FOREIGN PATENT DOCUMENTS

JP H02-153415 6/1990
JP 2006-107152 4/2006

(Continued)

OTHER PUBLICATIONS

International Search Report for PCT/JP2020/043060 mailed on Dec. 22, 2020.

*Primary Examiner* — David D Davis
(74) *Attorney, Agent, or Firm* — IPUSA, PLLC

(57) ABSTRACT

An input device includes a touch panel having an operation surface and configured to receive a touch input and a hover input by an operation body; a display device configured to display a plurality of selection items; a memory; and a processor coupled to the memory. The processor is configured to highlight a selection item, a selection of the selection item being made by the hover input from the plurality of selection items, confirm the selection of the selection item by the hover input in a case where a duration during which the selection item is selected by the hover input reaches a first predetermined threshold, and confirm a selection of the selection item by the touch input in a case where the touch input is detected on the selection item before the duration reaches the first predetermined threshold.

18 Claims, 26 Drawing Sheets

(58) Field of Classification Search
CPC ................ G06F 3/0443; G06F 3/0446; G06F 2203/04107; G06F 3/0482; G06F 3/04847
See application file for complete search history.

(56) References Cited

U.S. PATENT DOCUMENTS

| | | |
|---|---|---|
| 2016/0092062 A1 | 3/2016 | Miyagi et al. |
| 2019/0265828 A1* | 8/2019 | Hauenstein ............ G06F 3/0412 |
| 2020/0201542 A1 | 6/2020 | Kumami et al. |

FOREIGN PATENT DOCUMENTS

| | | |
|---|---|---|
| JP | 2006-236143 | 9/2006 |
| JP | 2014-219938 | 11/2014 |
| JP | 2015-014920 | 1/2015 |
| JP | 6373537 | 8/2018 |
| WO | 2009/069392 | 6/2009 |

* cited by examiner

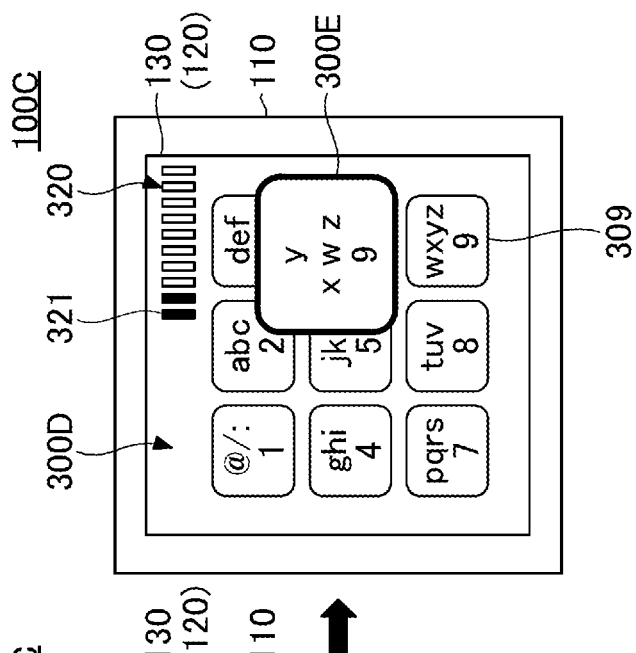
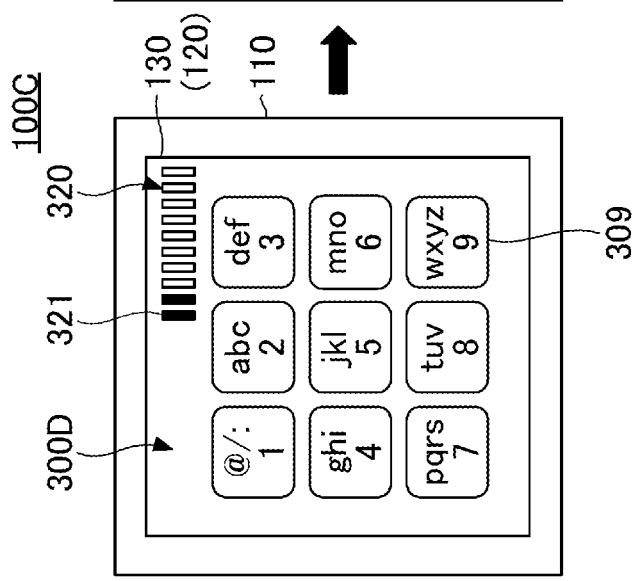
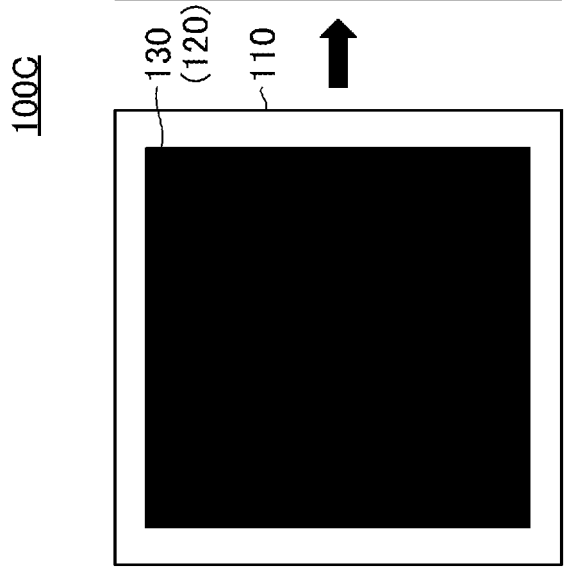

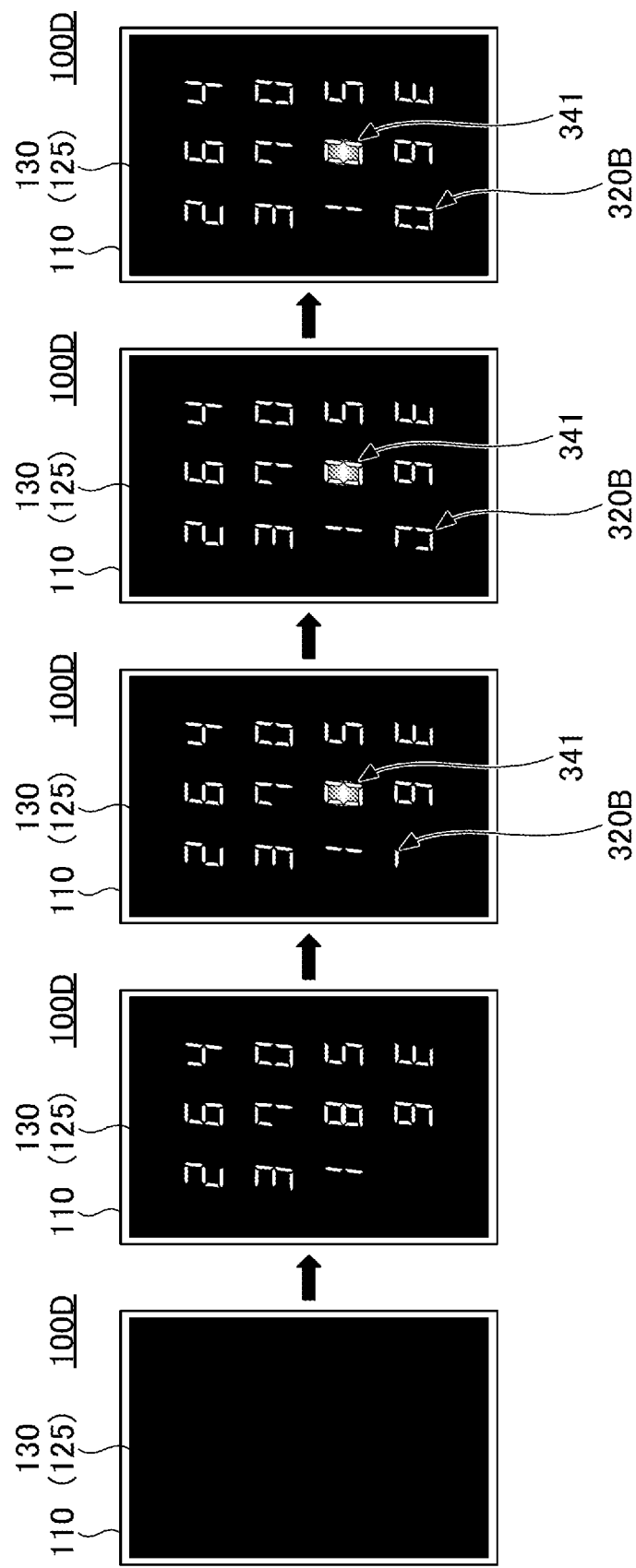

INPUT DEVICE ADAPTED TO RECEIVE A TOUCH INPUT AND A HOVER INPUT

CROSS-REFERENCE TO RELATED APPLICATIONS

This application is a continuation of International Application No. PCT/JP2020/043060, filed on Nov. 18, 2020 and designating the U.S., which claims priority to Japanese Patent Application No. 2019-225803, filed on Dec. 13, 2019. The contents of these applications are incorporated herein by reference in their entirety.

BACKGROUND OF THE INVENTION

1. Field of the Invention

The present disclosure relates to an input device.

2. Description of the Related Art

Conventionally, input devices capable of receiving hover inputs over operation surfaces are known. A hover input is an input operation performed by an operation body while the operation body is in proximity to, but not in contact with, an operation surface (in a non-contact state).

For example, Patent Document 1 below describes a technology that previews a ringtone, from among a list of ringtones displayed on a display device, when a user's finger located within a set distance from a display area of the ringtone is maintained for a predetermined period of time.

However, in a conventional input device capable of receiving a hover input, the selection of a selection item by the hover input needs to be continued for a predetermined period of time until the selection of the selection item is confirmed. Therefore, it is difficult to quickly execute a function, which is to be executed when the selection of the same function by a hover input is confirmed.

RELATED-ART DOCUMENTS

Patent Documents

Patent Document 1: Japanese Laid-Open Patent Publication No. 2015-14920

SUMMARY OF THE INVENTION

According to an embodiment of the present invention, an input device includes a touch panel having an operation surface and configured to receive a touch input and a hover input by an operation body; a display device configured to display a plurality of selection items; a memory; and a processor coupled to the memory. The processor is configured to highlight a selection item, a selection of the selection item being made by the hover input from the plurality of selection items, confirm the selection of the selection item by the hover input in a case where a duration during which the selection item is selected by the hover input reaches a first predetermined threshold, and confirm a selection of the selection item by the touch input in a case where the touch input is detected on the selection item before the duration reaches the first predetermined threshold.

BRIEF DESCRIPTION OF THE DRAWINGS

Other objects and further features of the present invention will be apparent from the following detailed description when read in conjunction with the accompanying drawings, in which:

FIG. 25A through FIG. 25C are diagrams illustrating examples of a selection confirming operation performed by an input device according to the fourth embodiment of the present invention;

FIG. 26A through FIG. 26E are diagrams illustrating examples of a selection confirming operation performed by an input device according to a fifth embodiment of the present invention;

DESCRIPTION OF THE EMBODIMENTS

According to an embodiment of the present invention, a function, which is to be executed when the selection of the same function by a hover input is confirmed, can be quickly executed.

In the following, embodiments of the present invention will be described with reference to the accompanying drawings.

First Embodiment (Outline of Input Device 100)

Figure 1:
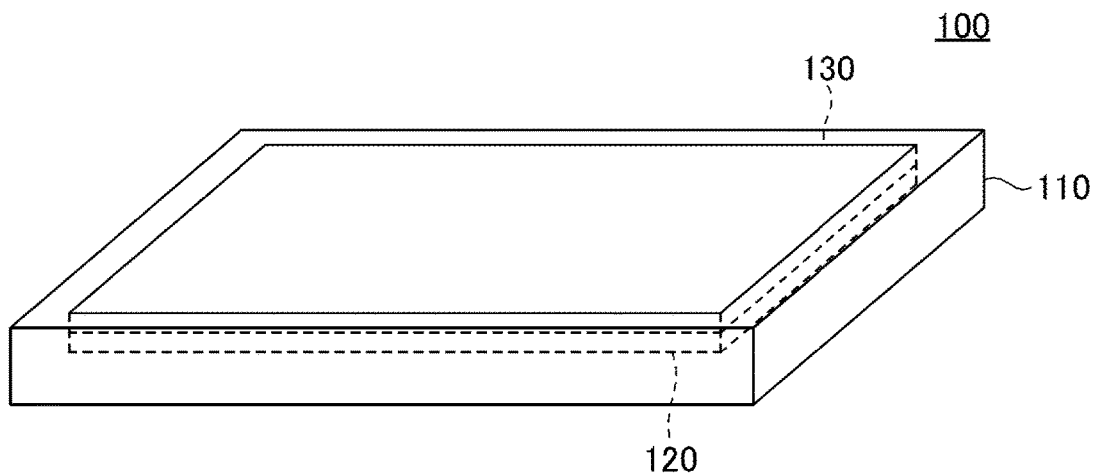
FIG. 1 is a perspective view of the exterior of an input device according to a first embodiment of the present invention.

FIG. 1 is a perspective view of the exterior of an input device 100 according to a first embodiment of the present invention. The input device 100 illustrated in FIG. 1 is a device capable of receiving touch inputs and hover inputs. The input device 100 receives an input operation performed by an operation body, and controls the operation of a control target device in accordance with the details of the input operation. The input device 100 may remotely control the control target device, or may be integrated into the control target device. Further, the input device 100 may be configured to be portable or fixedly installed on the wall or the like.

As illustrated in FIG. 1, the input device 100 includes a housing 110, a display device 120, and a touch panel 130.

The housing 110 is a box-shaped member that stores and holds various components. In the example illustrated in FIG. 1, the housing 110 has a rectangular parallelepiped shape. However, the housing 110 may have any shape other than the rectangular parallelepiped shape. Further, for example, the input device 100 does not necessarily include the housing 110, and may be embedded and installed at a predetermined location.

The touch panel 130 is a thin, flat plate-shaped device. The touch panel 130 is provided on the top surface of the housing 110. The touch panel 130 has an operation surface 130A. The operation surface 130A is exposed from the top surface of the housing 110. The touch panel 130 is configured to be able to receive a touch input (contact input) and a hover input (non-contact input) performed by the operation body (such as an operator's hand) with respect to the operation surface 130A. As the touch panel 130, a capacitive touch panel is used.

The display device 120 is a thin, flat plate-shaped device. The display device 120 is disposed on the bottom side of the touch panel 130. The display device 120 displays various display contents. The display device 120 can arrange and display a plurality of selection items. The display contents displayed on the display device 120 can be seen by the operator through the touch panel 130 from above the input device 100. Examples of the display device 120 include a liquid crystal display and an organic electroluminescent (EL) display. The display device is not limited to a video display. For example, the display device may include a plurality of LEDs, and the LEDs may be arranged in correspondence with the respective selection items.

(Examples of Display Contents of Input Device 100)

Figure 2:
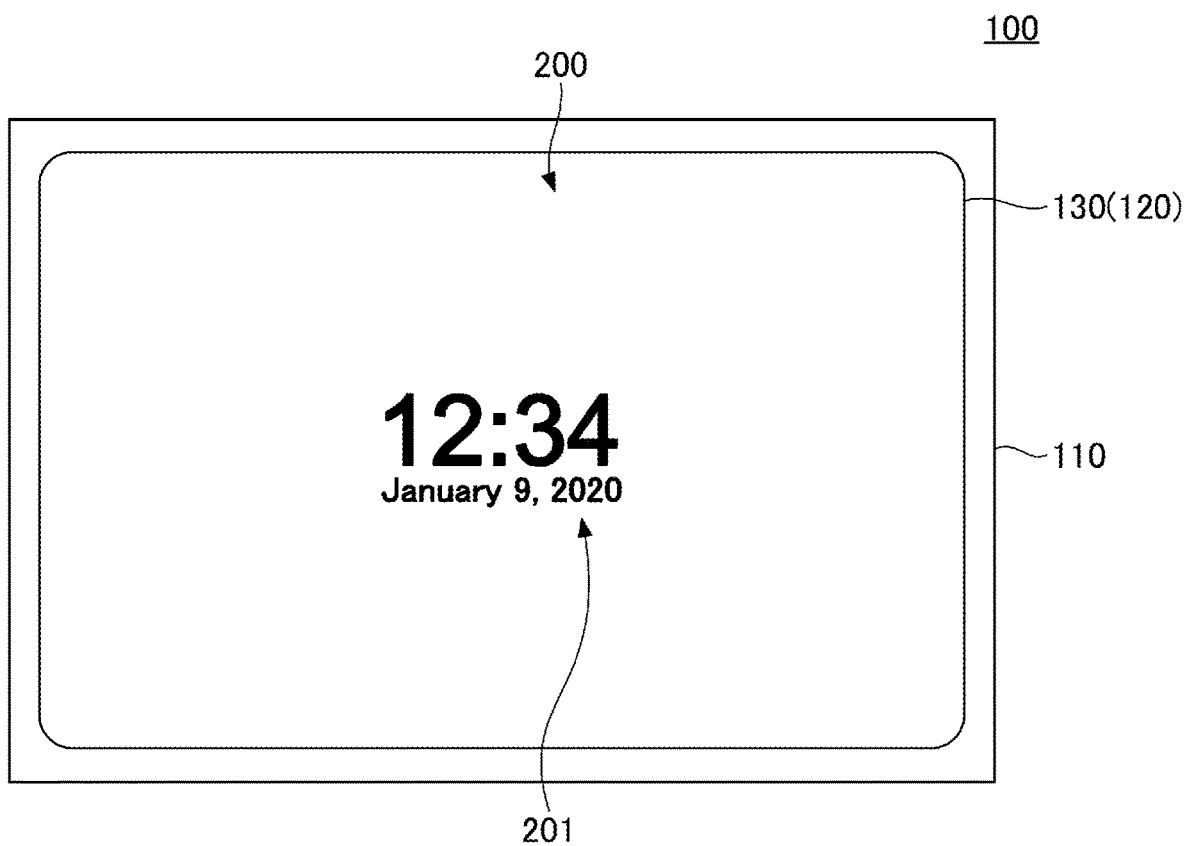
FIG. 2 is a diagram illustrating an example of display contents of the input device according to the first embodiment of the present invention.
Figure 3:
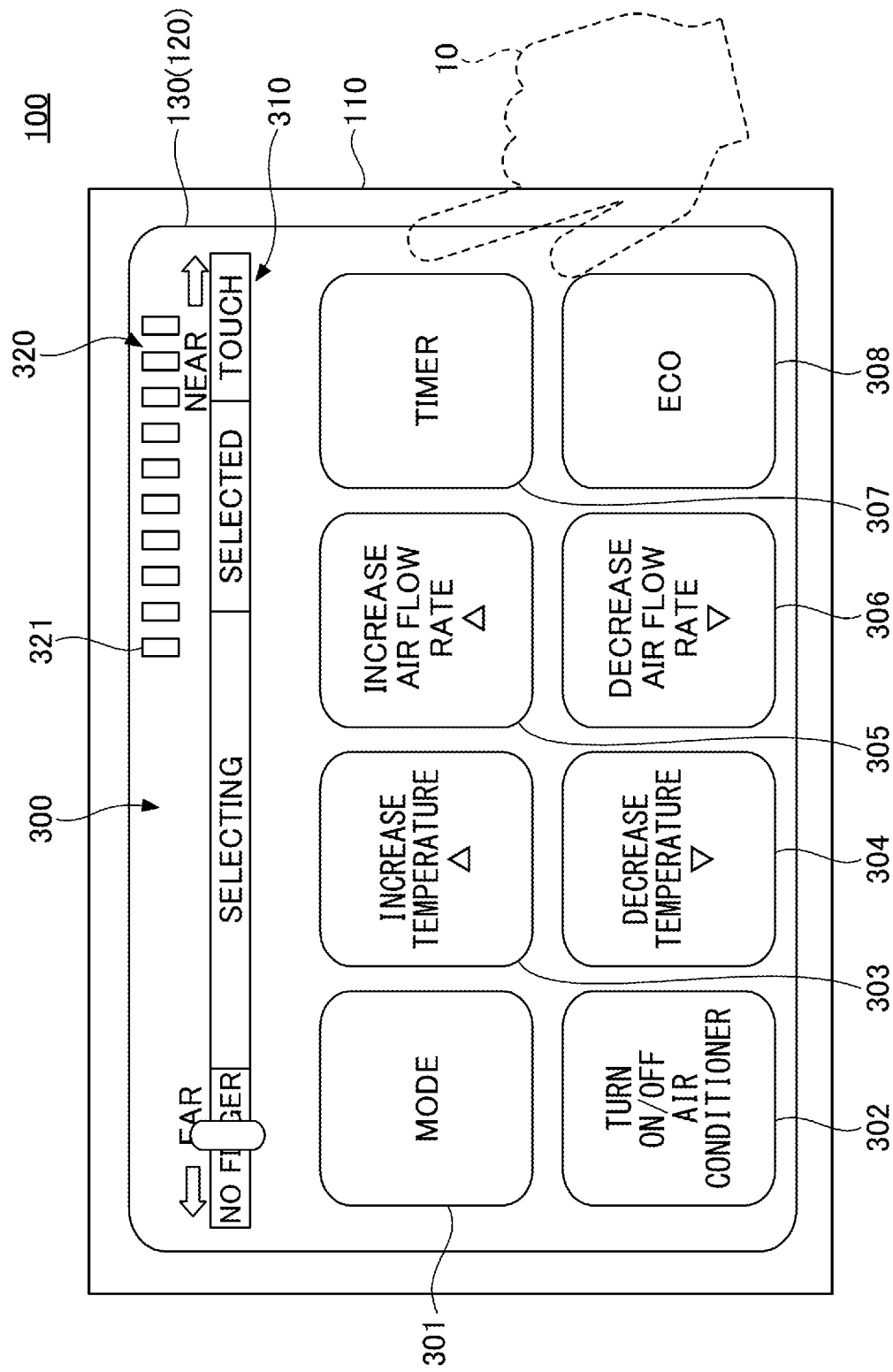
FIG. 3 is a diagram illustrating an example of display contents of the input device according to the first embodiment of the present invention.

FIG. 2 and FIG. 3 are examples of display contents of the input device 100 according to the first embodiment of the present invention. FIG. 2 depicts the contents displayed when an operator's hand 10 (an example of an "operation body") is not in proximity to the operation surface 130A of the touch panel 130. FIG. 3 depicts the contents displayed when the operator's hand 10 is in proximity to the operation surface 130A of the touch panel 130.

As illustrated in FIG. 2, the input device 100 causes the display device 120 to display a standby screen 200 while in a standby state in which the operator's hand is not in proximity to the operation surface 130A of the touch panel 130. The standby screen 200 displays date and time information 201 indicating the current date and time. Note that the input device 100 may cause the display device 120 to display no content while in a standby state. Further, the input device 100 may cause the display device 120 to display the standby screen 200 that displays information other than the date and time information 201 while in a standby state.

As illustrated in FIG. 3, upon the operator's hand 10 being in proximity to the operation surface 130A of the touch panel 130, the input device 100 detects the proximity of the operator's hand 10, and causes the display device 120 to display an operation screen 300. In the example illustrated in FIG. 3, the operation screen 300 displays input keys 301 through 308 arranged in a 4-by-2 matrix. The input keys 301 through 308 are examples of selection items when the input device 100 is used as a remote control device of an air conditioner. Each of the input keys 301 through 308 has a rectangular shape and has the same size.

The input key 301 is used to switch between modes of the air conditioner. The input key 302 is used to turn on or off the air conditioner. The input key 303 is used to increase the set temperature of the air conditioner. The input key 304 is used to decrease the set temperature of the air conditioner.

The input key 305 is used to increase the air flow rate of the air conditioner. The input key 306 is used to decrease the air flow rate of the air conditioner. The input key 307 is used to activate a timer function of the air conditioner: The input key 308 is used to cause the air conditioner to operate in ECO mode.

The input device 100 receives an input operation performed by the operator's hand 10 with respect to any of the input keys 301 through 308 of the touch panel 130 when the operation screen 300 is displayed. Both a touch input and a hover input can be performed by the operator's hand 10 with respect to each of the input keys 301 through 308.

For example, when a hover input is performed by the operator's hand 10 with respect to any of the input keys 301 through 308, the hover input is confirmed after the hover input is continued for a predetermined period of time. Conversely, when a touch input is performed by the operator's hand 10 on any of the input keys 301 through 308, the touch input is immediately confirmed.

Further, the operation screen 300 displays a proximity bar 310 and an indicator 320.

The proximity bar 310 is a bar-shaped display object that extends laterally. The proximity bar 310 indicates the distance between the operation surface 130A and the operator's hand 10 by the lateral position of a slider 311. The proximity bar 310 indicates that, as the slider 311 is positioned closer to the left, the distance between the operation surface 130A and the operator's hand 10 increases.

The indicator 320 includes a plurality of (in the example illustrated in FIG. 3, ten) scales 321. The scales 321 are arranged in a line in the lateral direction. The indicator 320 uses the plurality of scales 321 to indicate the duration of a hover input. For example, when the count of the duration of a hover input is "i", the i number of scales 321 of the indicator 320 are illuminated. The indicator 320 is an example of a "display object". As the duration of the hover input increases, the number of scales 321 that are illuminated gradually increases. The scales 321 are an example of an "area representing the duration". When the duration of the hover input reaches a predetermined threshold, that is, when the hover input is continued for a predetermined period of time and the hover input is confirmed, all the scales 321 of the indicator 320 are illuminated. That is, in the indicator 320, scales 321 in an illuminated state indicate the duration of the hover input, and scales 321 in a non-illuminated state indicate the amount of time remaining until the duration of the hover input reaches the predetermined threshold. Note that the indicator 320 may be configured such that the area representing the duration gradually decreases as the duration of the hover input increases. Further, the indicator 320 may use numerical values to represent one or both of the duration of the hover input and the amount of time remaining.

(Configuration of Input Device 100)

Figure 4:
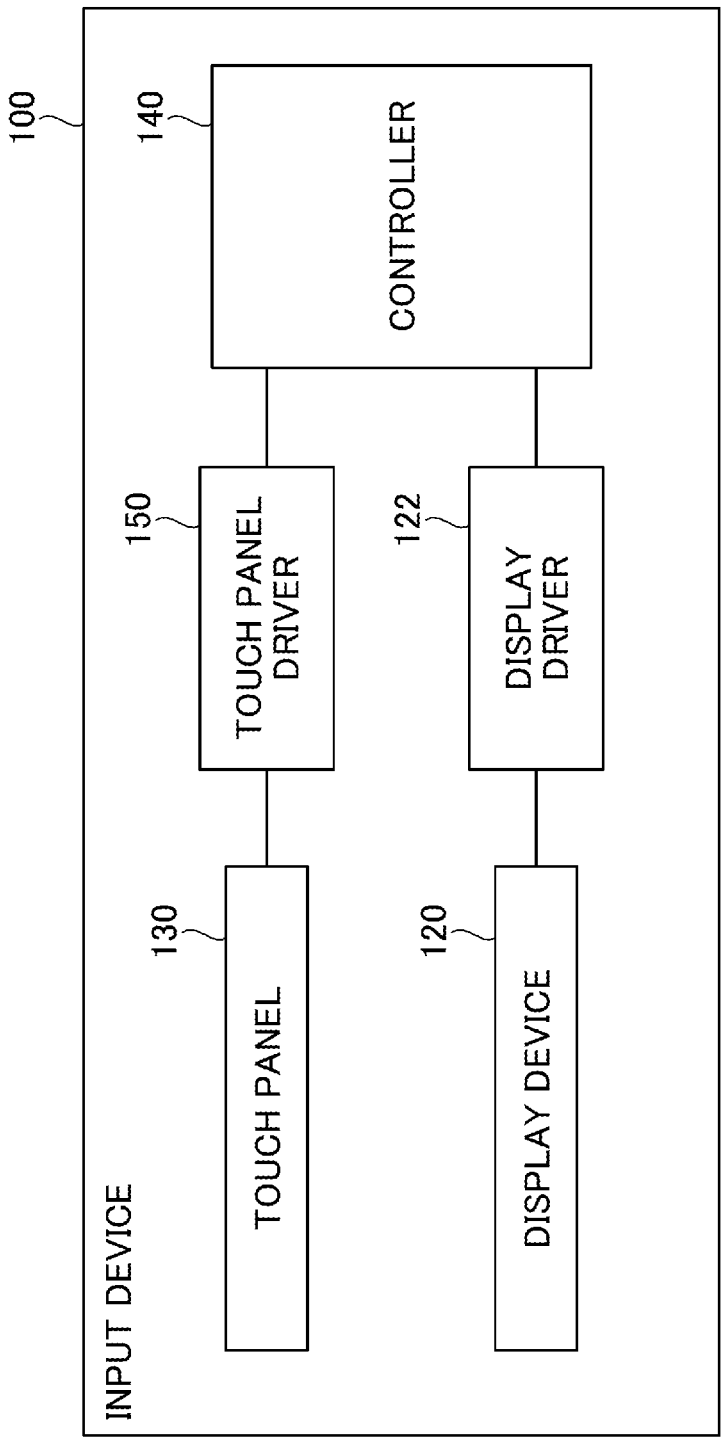
FIG. 4 is diagram illustrating a configuration of the input device according to the first embodiment of the present invention.

FIG. 4 is diagram illustrating a configuration of the input device 100 according to the first embodiment of the present invention. As illustrated in FIG. 4, the input device 100 includes the display device 120, a display driver 122, the touch panel 130, a touch panel driver 150, and a controller 140.

The display driver 122 causes the display device 120 to display various display contents by driving the display device 120 in accordance with an image signal supplied from the controller 140.

The touch panel driver 150 detects a capacitance at the touch panel 130 by driving detection electrodes (not illustrated) of the touch panel 130. Then, the touch panel driver 150 outputs a capacitance detection signal representing a capacitance value of the detected capacitance to the controller 140.

The controller 140 controls the entire input device 100. For example, the controller 140 controls the display of the display device 120, an input operation on the touch panel 130, the output of an operation signal to an operation target device. For example, a microcomputer or the like may be used as the controller 140.

(Hardware Configuration of Controller 140)

Figure 5:
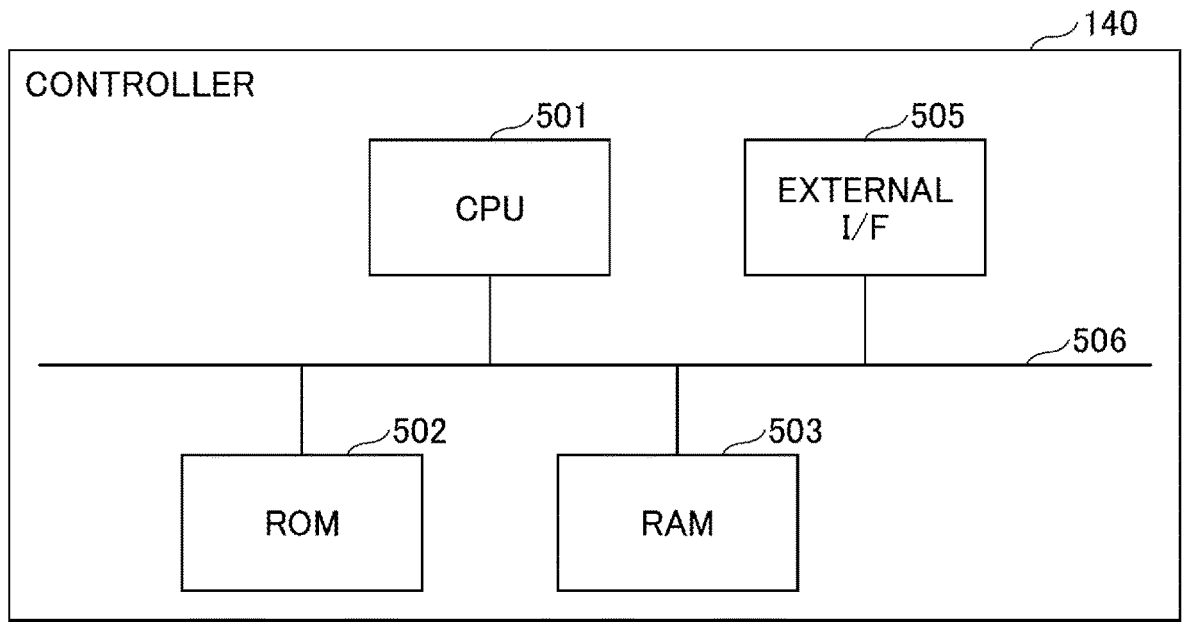
FIG. 5 is a diagram illustrating a hardware configuration of a controller according to the first embodiment of the present invention.

FIG. 5 is a diagram illustrating a hardware configuration of the controller 140 according to the first embodiment of the present invention. As illustrated in FIG. 5, the controller 140 includes a central processing unit (CPU) 501, a read-only memory (ROM) 502, a random-access memory (RAM) 503, and an external interface (I/F) 505. The hardware devices are connected to each other via a bus 506.

The CPU 501 controls the operation of the controller 140 by executing various types of programs stored in the ROM 502. The ROM 502 is a non-volatile memory. For example, the ROM 502 stores various types of programs executed by the CPU 501 and also stores data necessary for the CPU 501 to execute the various types of programs. The RAM 503 is a main storage device such as a dynamic random-access memory (DRAM) or a static random-access memory (SRAM). For example, the RAM 503 functions as a working area that is used by the CPU 501 to execute the various types of programs. The I/F 505 controls the input/output of an external device (such as an operation target device of the touch panel driver 150, the display driver 122, and the input device 100).

(Functional Configuration of Controller 140)

Figure 6:
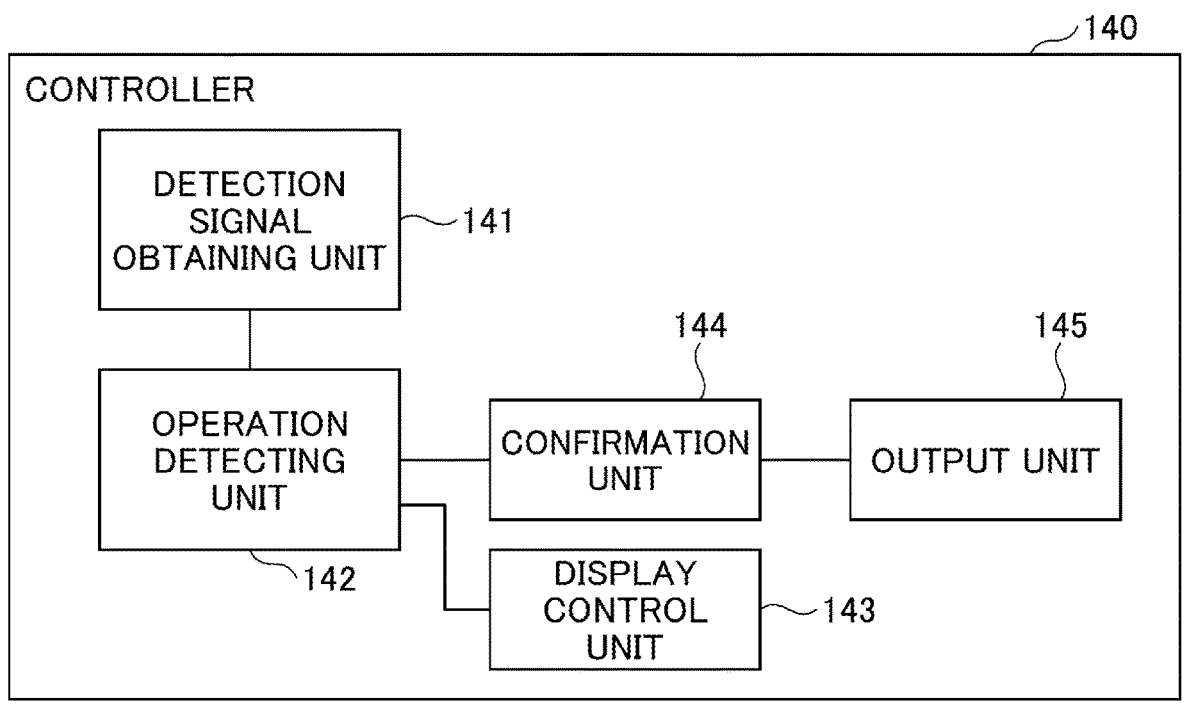
FIG. 6 is a diagram illustrating a functional configuration of the controller according to the first embodiment of the present invention.

FIG. 6 is a diagram illustrating a functional configuration of the controller 140 according to the first embodiment of the present invention. As illustrated in FIG. 6, the controller 140 includes a detection signal obtaining unit 141, an operation detecting unit 142, a display control unit 143, a confirmation unit 144, and an output unit 145.

The functions of the controller 140 illustrated in FIG. 6 are implemented by, for example, causing the CPU 501 to execute a program stored in the ROM 502. The program may be provided by being preliminarily installed in the controller 140. Alternatively, the program may be externally provided and installed in the controller 140. In the latter case, the program may be provided via an external storage medium (such as USB memory, a memory card; or a CD-ROM) or may be downloaded from a server on a network (such as the Internet).

The detection signal obtaining unit 141 obtains a capacitance detection signal output from the touch panel driver 150. For example, the touch panel driver 150 continuously outputs a capacitance detection signal at a predetermined time interval. Accordingly, the detection signal obtaining unit 141 continuously obtains a capacitance detection signal.

The operation detecting unit 142 detects an input performed by the operation body (such as the operator's hand 10) with respect to the operation surface 130A of the touch panel 130, based on a capacitance detection signal (that is, a capacitance at the touch panel 130) obtained by the detection signal obtaining unit 141. The operation detecting unit 142 can separately detect a hover input with respect to the operation surface 130A and a touch input on the operation surface 130A based on the magnitude of a capacitance, the distribution of capacitances, and the like by using a known technique.

Further, the operation detecting unit 142 can identify an operation position with respect to the operation surface 130A based on a capacitance detection signal obtained by the detection signal obtaining unit 141, and identify a selection item displayed by the display device 120 at the operation position, as a selected display item.

The display control unit 143 causes the display device 120 to display various display contents by supplying image signals to the display driver 122. For example, when the proximity of the operation body to the operation surface 130A of the touch panel 130 is not detected, the display control unit 143 causes the display device 120 to display the standby screen 200 illustrated in FIG. 2. Further, for example, when the proximity of the operation body to the operation surface 130A of the touch panel 130 has been detected, the display control unit 143 causes the display device 120 to display the operation screen 300 illustrated in FIG. 3.

Further, a hover input is detected by the operation detecting unit 142 with respect to a selection item displayed by the display device 120, the display control unit 143 can highlight the selection item. For example, the display control unit 143 can highlight the selection item selected by the hover input by enlarging and displaying the selection item.

Further, the display control unit 143 can cause the display device 120 to display a display object representing one or both of the duration of a hover input and the amount of time remaining until the duration of the hover input reaches the predetermined threshold. For example, the display control unit 143 can cause the display device 120 to display the indicator 320 having a bar shape (see FIG. 3) or an indicator 320A having an annular shape (see FIG. 15 and FIG. 16). Each of the indicator 320 and the indicator 320A includes an area representing the duration of a hover input, and the area representing the duration increases as the duration of the hover input increases.

In a case where a hover input is detected by the operation detecting unit 142 with respect to any selection item displayed by the display device 120, and the selection of the selection item by the hover input is continued for a predetermined period of time, the confirmation unit 144 confirms the selection of the selection item by the hover input.

Further, in a case where a hover input is detected by the operation detecting unit 142 with respect to any selection item displayed by the display device 120, and a touch input is detected on the selection item before the hover input is continued for the predetermined period of time, the confirmation unit 144 confirms the selection of the selection item by the touch input.

Further, in a case where a touch input is detected by the operation detecting unit 142 on any selection item displayed by the display device 120, the confirmation unit 144 immediately confirms the selection of the selection item by the touch input.

When the confirmation unit 144 confirms the selection of the selection item, the output unit 145 outputs a control signal corresponding to the selection item to an operation target device (such as an air conditioner). The output unit 145 may output the control signal via wireless communication or via wired communication.

(First Example of Main Process Performed by Controller 140)

Figure 7:
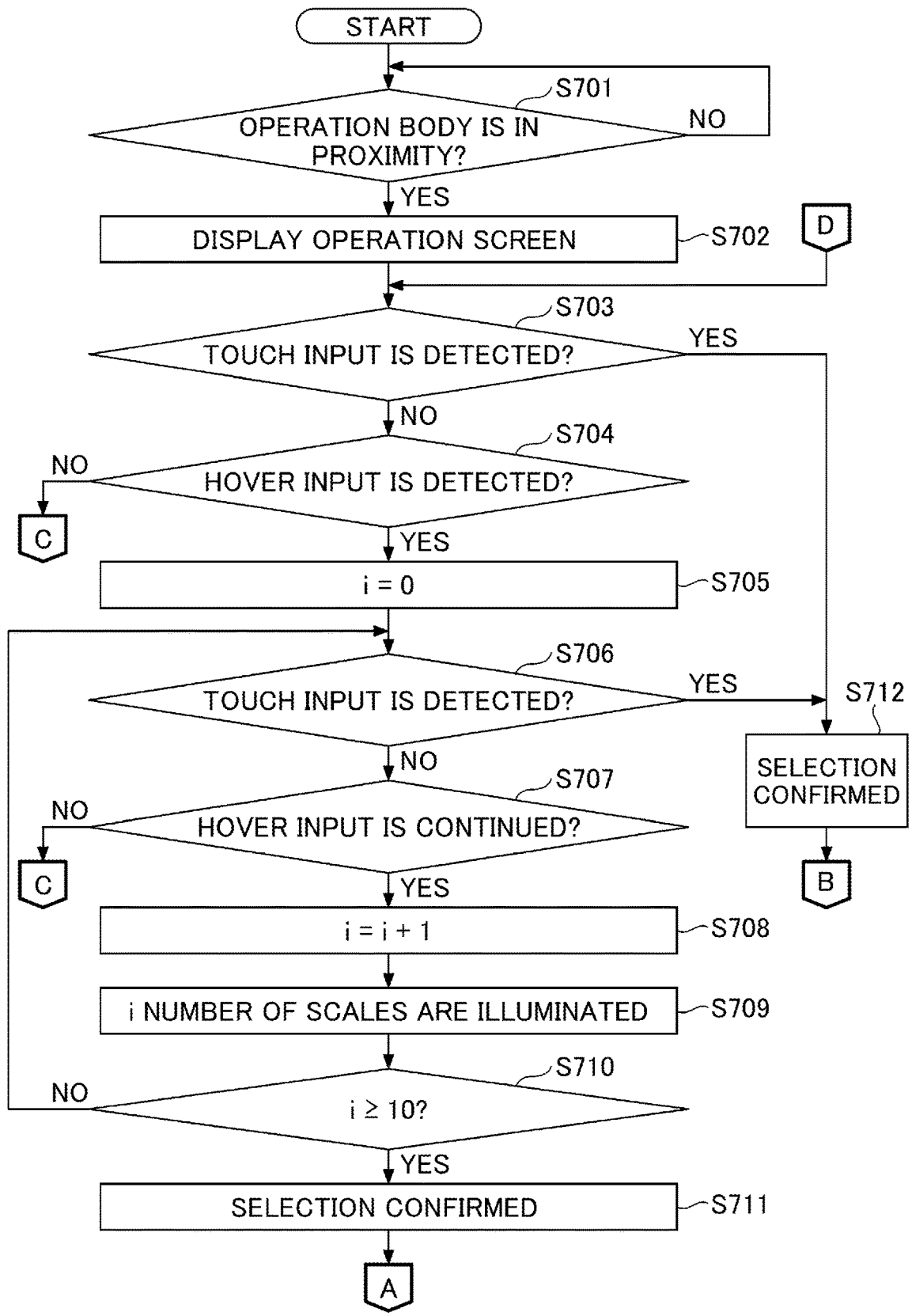
FIG. 7 is a flowchart illustrating a first example of a main process performed by the controller according to the first embodiment of the present invention.

FIG. 7 is a flowchart illustrating a first example of a main process performed by the controller 140 according to the first embodiment of the present invention.

First, the operation detecting unit 142 determines whether the operation body is in proximity to the operation surface 130A of the touch panel 130 based on a capacitance detection signal obtained by the detection signal obtaining unit 141 (step S701).

If the operation detecting unit 142 determines that the operation body is not in proximity in step S701 (no in step S701), the operation detecting unit 142 performs step S701 again.

Conversely, if the operation detecting unit 142 determines that the operation body is in proximity in step S701 (yes in step S701), the display control unit 143 causes the display device 120 to display the operation screen 300 illustrated in FIG. 3 (step S702).

Next, the operation detecting unit 142 determines whether a touch input is detected on any of the input keys 301 through 308 (see FIG. 3) displayed on the operation screen 300, based on a capacitance detection signal obtained by the detection signal obtaining unit 141 (step S703).

If the operation detecting unit 142 determines that a touch input is detected on any of the input keys 301 through 308 in step S703 (yes in S703), the confirmation unit 144 confirms the selection of any of the input keys 301 through 308 by the touch input (step S712). Then, the controller 140 causes the process to proceed to step S901 in a flowchart of FIG. 9.

Conversely, if the operation detecting unit 142 determines that a touch input is not detected on any of the input keys 301 through 308 in step S703 (no in S703), the operation detecting unit 142 determines whether a hover input is detected with respect to any of the input keys 301 through 308 displayed on the operation screen 300 based on a capacitance detection signal obtained by the detection signal obtaining unit 141 (step S704).

Figure 10:
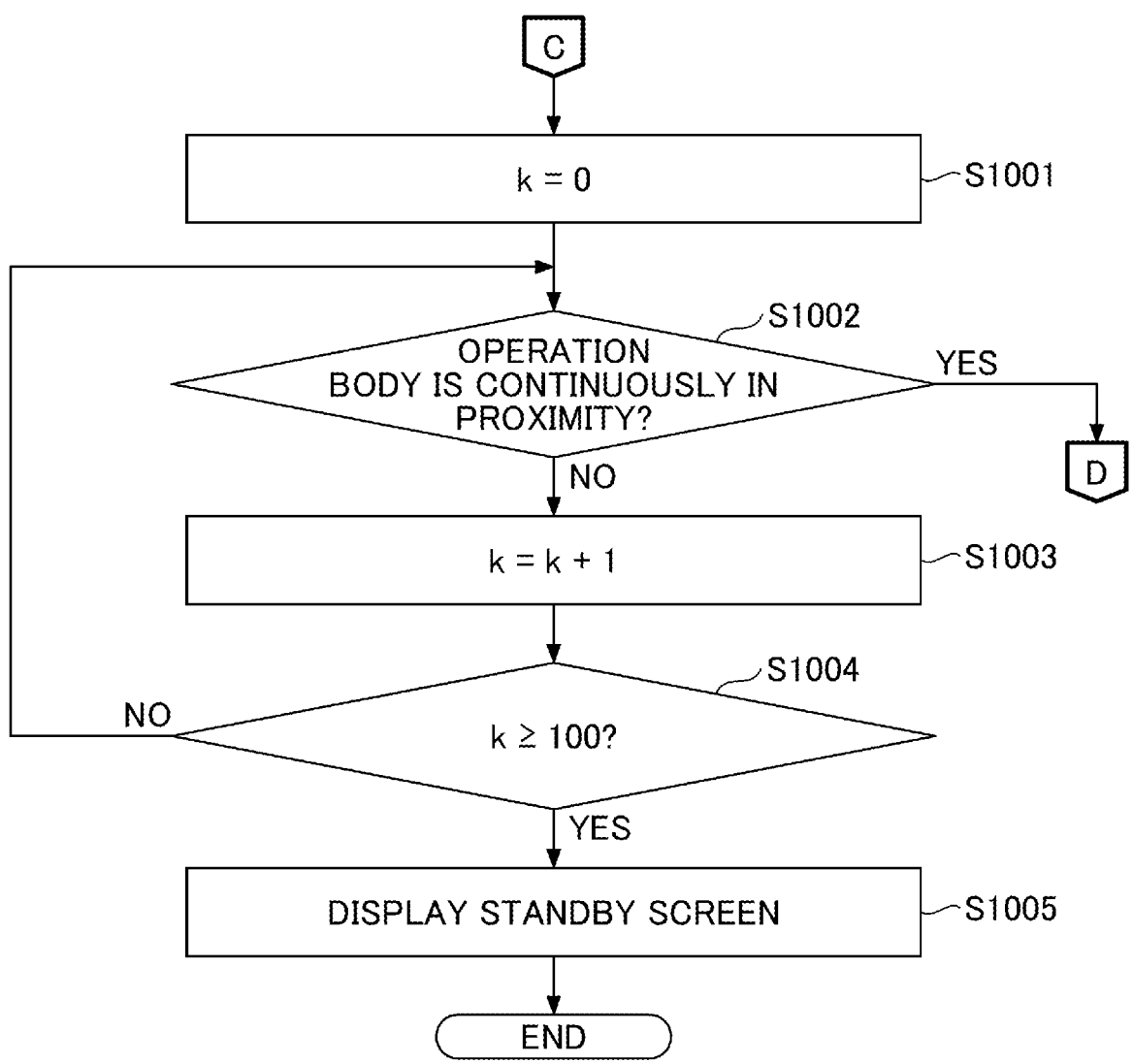
FIG. 10 is a flowchart illustrating an example of a process performed by the controller after an input is released according to the first embodiment of the present invention.

If the operation detecting unit 142 determines that a hover input is not detected with respect to any of the input keys 301 through 308 in step S704 (no in step S704), the controller 140 causes the process to proceed to step S1001 in a flowchart of FIG. 10.

Conversely, if the operation detecting unit 142 determines that a hover input is detected with respect to any of the input keys 301 through 308 in step S704 (yes in step S704), the confirmation unit 144 sets a variable i to "0" (step S705). The variable i represents the count of the duration of the hover input.

Next, the operation detecting unit 142 determines whether a touch input is detected on any of the input keys 301 through 308 displayed on the operation screen 300, based on a capacitance detection signal obtained by the detection signal obtaining unit 141 (step S706).

If the operation detecting unit 142 determines that a touch input is detected on any of the input keys 301 through 308 in step S706 (yes in step S706), the confirmation unit 144 confirms the selection of any of the input keys 301 through 308 by the touch input (step S712). Then, the controller 140 causes the process to proceed to step S901 in the flowchart of FIG. 9.

Conversely, if the operation detecting unit 142 determines that a touch input is not detected on any of the input keys 301 through 308 in step S706 (no in step S706), the operation detecting unit 142 determines whether the hover input, detected in step S704, is continued based on a capacitance detection signal obtained by the detection signal obtaining unit 141 (step S707).

If the operation detecting unit 142 determines that the hover input is not continued in step S707 (no in step S707), the controller 140 causes the process to proceed to step S1001 in the flowchart of FIG. 10.

Conversely, if the operation detecting unit 142 determines that the hover input is continued in step S707 (yes in step S707), the confirmation unit 144 adds "1" to the variable i (step S708). Then, the display control unit 143 causes the i number of scales 321 displayed on the operation screen 300 to be illuminated (step S709).

Further, the confirmation unit 144 determines whether the variable i is greater than or equal to "10" (step S710).

If the confirmation unit 144 determines that the variable i is not greater than or equal to "10" in step S710 (no in S710), the controller 140 causes the process to return to step S706.

Conversely, if the confirmation unit 144 determines that the variable i is greater than or equal to "10" in step S710 (yes in S710), the confirmation unit 144 confirms the selection of any of the input keys 301 through 308 by the hover input (step S711). Then, the controller 140 causes the process to proceed to step S801 in a flowchart of FIG. 8.

(First Example of Process Performed by Controller 140 After Selection by Hover Input is Confirmed)

Figure 8:
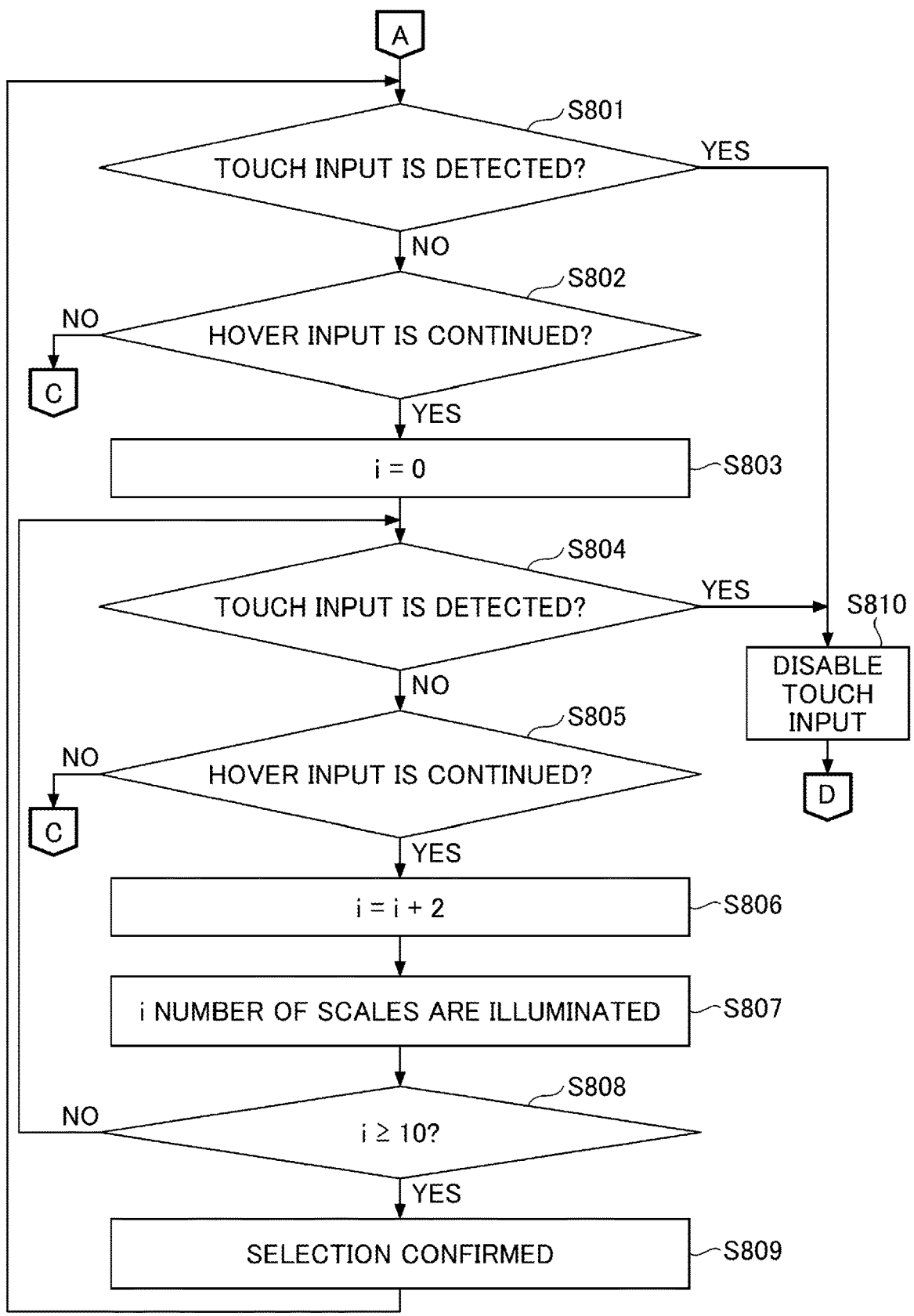
FIG. 8 is a flowchart illustrating a first example of a process performed by the controller after the selection by a hover input is confirmed according to the first embodiment of the present invention.

FIG. 8 is a flowchart illustrating a first example of a process performed by the controller 140 after the selection by the hover input is confirmed according to the first embodiment of the present invention.

First, the operation detecting unit 142 determines whether a touch input is detected on any of the input keys 301 through 308, displayed on the operation screen 300, based on a capacitance detection signal obtained by the detection signal obtaining unit 141 (step S801).

If the operation detecting unit 142 determines that a touch input is detected on any of the input keys 301 through 308 in step S801 (yes in step S801), the confirmation unit 144 disables the touch input (step S810). Then, the controller 140 ends the process illustrated in FIG. 8, and determines whether a touch input is detected again (step S703). Note that the confirmation unit 144 enables a touch input detected for the second time after confirming the selection by the hover input (yes in step S703 and step S712 of FIG. 7).

Conversely, if the operation detecting unit 142 determines that a touch input is not detected on any of the input keys 301 through 308 in step S801 (no in step S801), the operation detecting unit 142 determines whether the hover input, detected in step S704, is continued based on a capacitance detection signal obtained by the detection signal obtaining unit 141 (step S802).

If the operation detecting unit 142 determines that the hover input is not continued in Step S802 (no in step S802), the controller 140 causes the process to proceed to step S1001 in the flowchart of FIG. 10.

Conversely, if the operation detecting unit 142 determines that the hover input is continued in step S802 (yes in step S802), the confirmation unit 144 sets the variable i to "0" (step S803).

Next, the operation detecting unit 142 determines whether a touch input is detected on any of the input keys 301 through 308, displayed on the operation screen 300, based on a capacitance detection signal obtained by the detection signal obtaining unit 141 (step S804).

If the operation detecting unit 142 determines that a touch input is detected on any of the input keys 301 through 308 in step S804 (yes in step S804), the confirmation unit 144 disables the touch input (step S810). Then, the controller 140 ends the process illustrated in FIG. 8, and determines whether a touch input is detected again (step S703). Note that the confirmation unit 144 enables a touch input detected for the second time after confirming the selection by the hover input (yes in step S703 and step S712 of FIG. 7).

Conversely, if the operation detecting unit 142 determines that "a touch input is not detected on any of the input keys 301 through 308" in step S804 (no in step S804), the operation detecting unit 142 determines whether the hover input, detected in step S704, is continued based on a capacitance detection signal obtained by the detection signal obtaining unit 141 (step S805).

If the operation detecting unit 142 determines that the hover input is not continued in step S805 (no in step S805), the controller 140 causes the process to proceed to step S1001 in the flowchart of FIG. 10.

Conversely, if the operation detecting unit 142 determines that the hover input is continued in step S805 (yes in step S805), the confirmation unit 144 adds "2" to the variable i (step S806). Then, the display control unit 143 causes the i number of scales 321 displayed on the operation screen 300 to be illuminated (step S807).

Further, the confirmation unit 144 determines whether the variable i is greater than or equal to 10 (step S808).

If the confirmation unit 144 determines that the variable i is not greater than or equal to "10" in step S808 (no in step S808), the controller 140 causes the process to return to step S804.

Conversely, if the confirmation unit 144 determines that the variable i is greater than or equal to "10" in step S808 (yes in step S808), the confirmation unit 144 confirms the selection of any of the input keys 301 through 308 (step S809). Then, the controller 140 causes the process to return to step S801.

(Example of Process Performed by Controller 140 After Selection by Touch Input is Confirmed)

Figure 9:
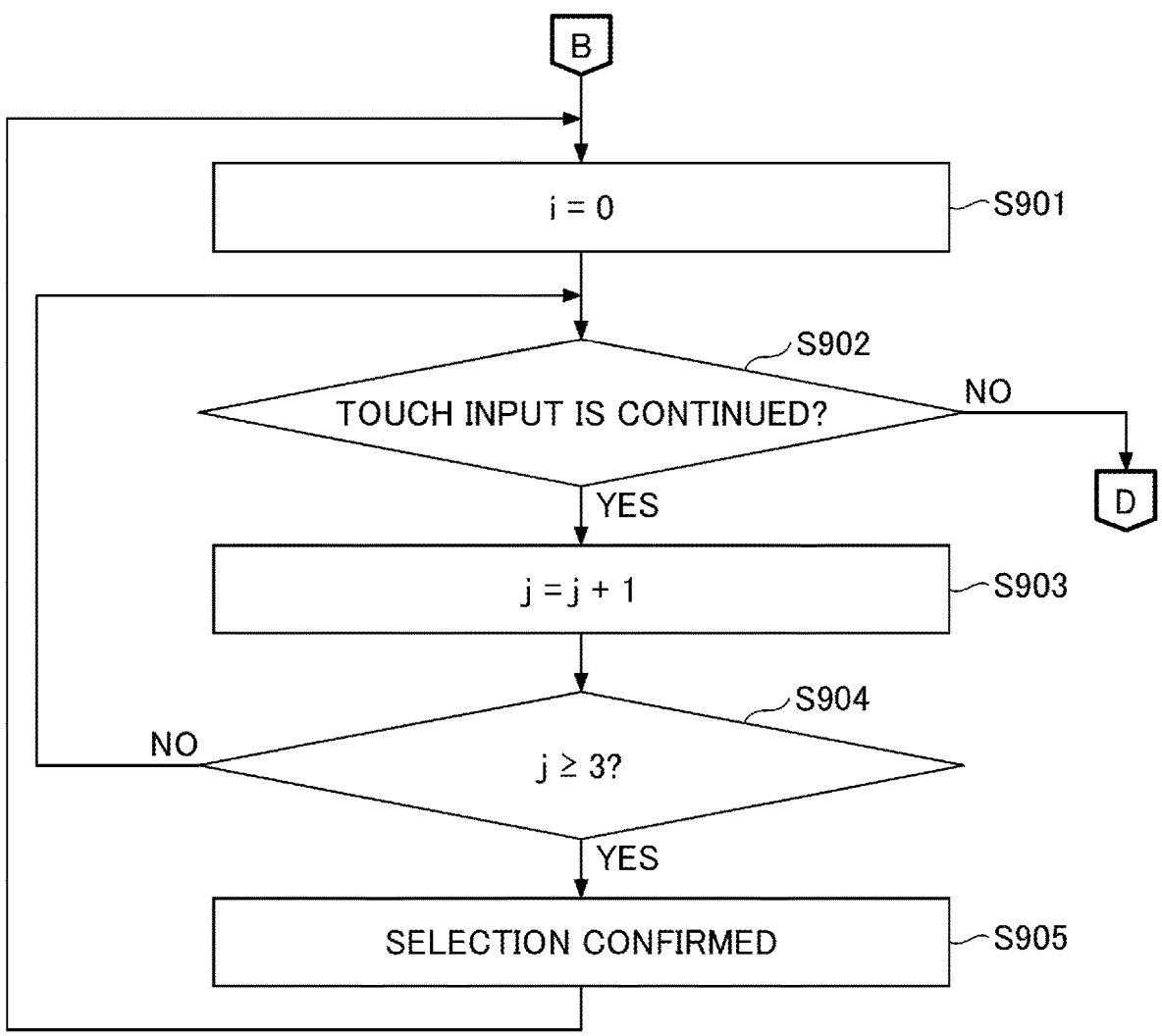
FIG. 9 is a flowchart illustrating an example of a process performed by the controller after the selection by a touch input is confirmed according to the first embodiment of the present invention.

FIG. 9 is a flowchart illustrating an example of a process performed by the controller 140 after the selection by the touch input is confirmed according to the first embodiment of the present invention.

First, the confirmation unit 144 sets a variable j to "0" (step S901). The variable j represents the count of the duration of the touch input.

Next, the operation detecting unit 142 determines whether the touch input, detected in step S703 or S706, is continued based on a capacitance detection signal obtained by the detection signal obtaining unit 141 (step S902).

If the operation detecting unit 142 determines that the touch input is not continued in step S902 (no in step S902), the controller 140 causes the process to return to step S703 in the flowchart of FIG. 7.

Conversely, if the operation detecting unit 142 determines that the touch input is continued in step S902 (yes in step S902), the confirmation unit 144 adds "1" to the variable j (step S903). Then, the confirmation unit 144 determines whether the variable j is greater than or equal to "3" (step S904).

If the confirmation unit 144 determines that the variable j is not greater than or equal to "3" in step S904 (no in step S904), the controller 140 causes the process to return to step S902.

Conversely, if the confirmation unit 144 determines that the variable j is greater than or equal to "3" in step S904 (yes in step S904), the confirmation unit 144 confirms the selection of any of the input keys 301 through 308 by the touch input (step S905). Then; the controller 140 causes the process to return to step S901.

(Example of Process Performed by Controller 140 After Input Is Released)

FIG. 10 is a flowchart illustrating an example of a process performed by the controller 140 after an input is released according to the first embodiment of the present invention.

First, the confirmation unit 144 sets a variable k to "0" (step S1001). The variable k represents the count of the duration after the touch input or the hover input is released.

Next, the operation detecting unit 142 determines whether the operation body is continuously in proximity to the operation surface 130A of the touch panel 130 based on a capacitance detection signal obtained by the detection signal obtaining unit 141 (step S1002).

If the operation detecting unit 142 determines that the operation body is in proximity in step S1002 (yes in step S1002), the controller 140 causes the process to return to step S703 in the flowchart of FIG. 7.

Conversely, if the operation detecting unit 142 determines that the operation body is not in proximity in step S1002 (no in step S1002), the confirmation unit 144 adds "1" to the variable k (step S1003). Then, the confirmation unit 144 determines whether the variable k is greater than or equal to "100" (step S1004).

If the confirmation unit 144 determines that the variable k is not greater than or equal to "100" in step S1004 (no in step S1004), the controller 140 causes the process to return to step S1002.

Conversely, if the confirmation unit 144 determines that the variable k is greater than or equal to "100" in step S1004 (yes in step S1004), the display control unit 143 causes the display device 120 to display the standby screen 200 illustrated in FIG. 2 (step S1005). Then, the controller 140 ends the processes illustrated in FIG. 7 through FIG. 10.

(Example of Selection Confirming Operation Performed by Input Device 100)

FIG. 11 through FIG. 14 are diagrams illustrating examples of a selection confirming operation performed by the input device 100 according to the first embodiment of the present invention. FIG. 11 through FIG. 14 depict examples of the operation screen 300 illustrated in FIG. 3 when a hover input or a touch input is performed with respect to the operation screen 300.

Figure 11:
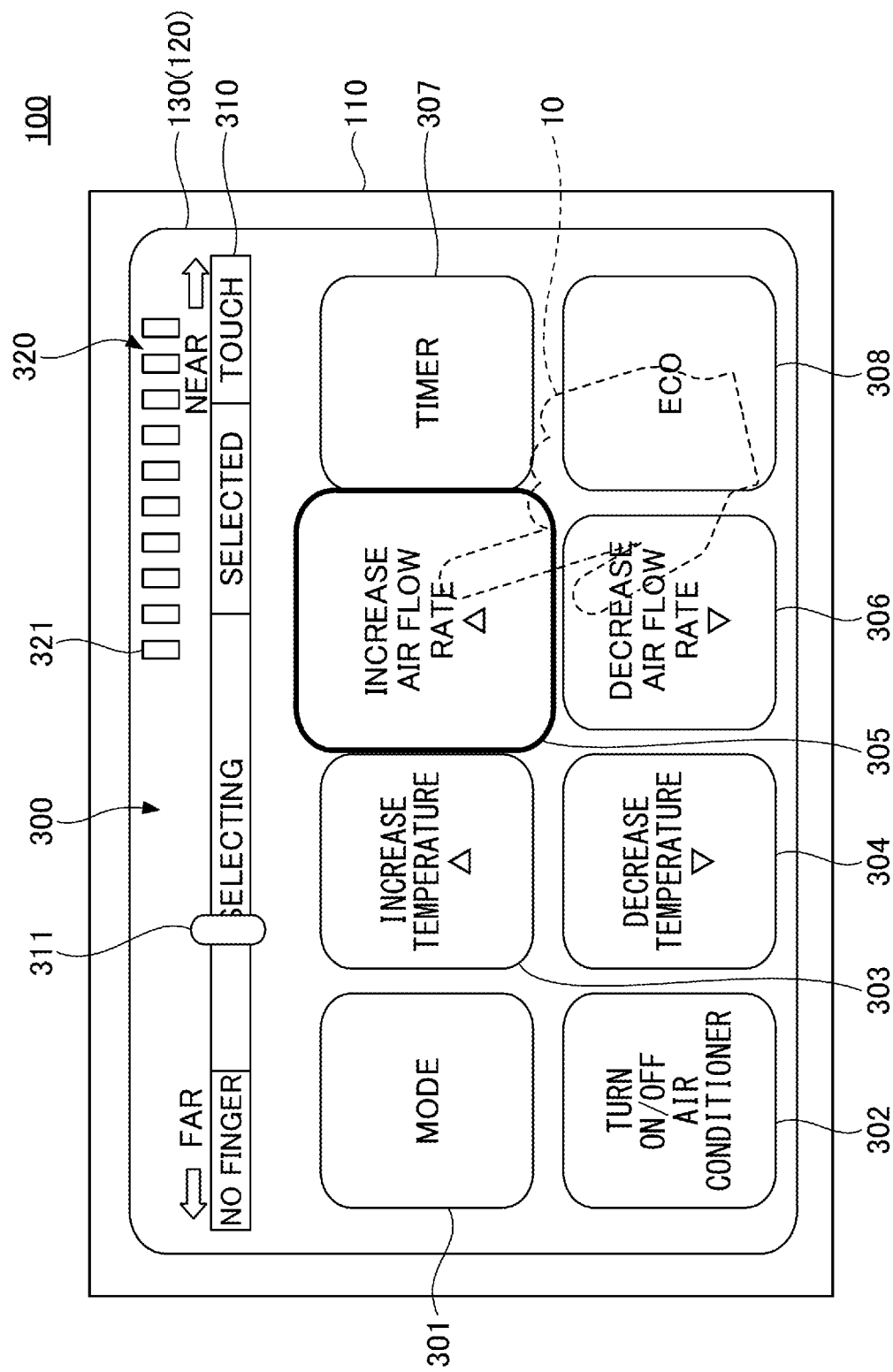
FIG. 11 is a diagram illustrating an example of a selection confirming operation performed by the input device according to the first embodiment of the present invention.

As illustrated in FIG. 11, when the input key 305 of the operation screen 300 is selected by the user performing a hover input with the hand 10, the display control unit 143 of the controller 140 enlarges the input key 305. Accordingly, the input key 305 is highlighted and the operator can visually recognize that the input key 305 is selected. In the example illustrated in FIG. 11, the distance between the operation surface 130A and the hand 10 is within a first predetermined proximity range. In this case, as illustrated in FIG. 11, the slider 311 of the proximity bar 310 displayed on the operation screen 300 is positioned in a "selecting" area that corresponds to the first predetermined proximity range, and the input device 100 does not start counting the duration of the hover input.

Figure 12:
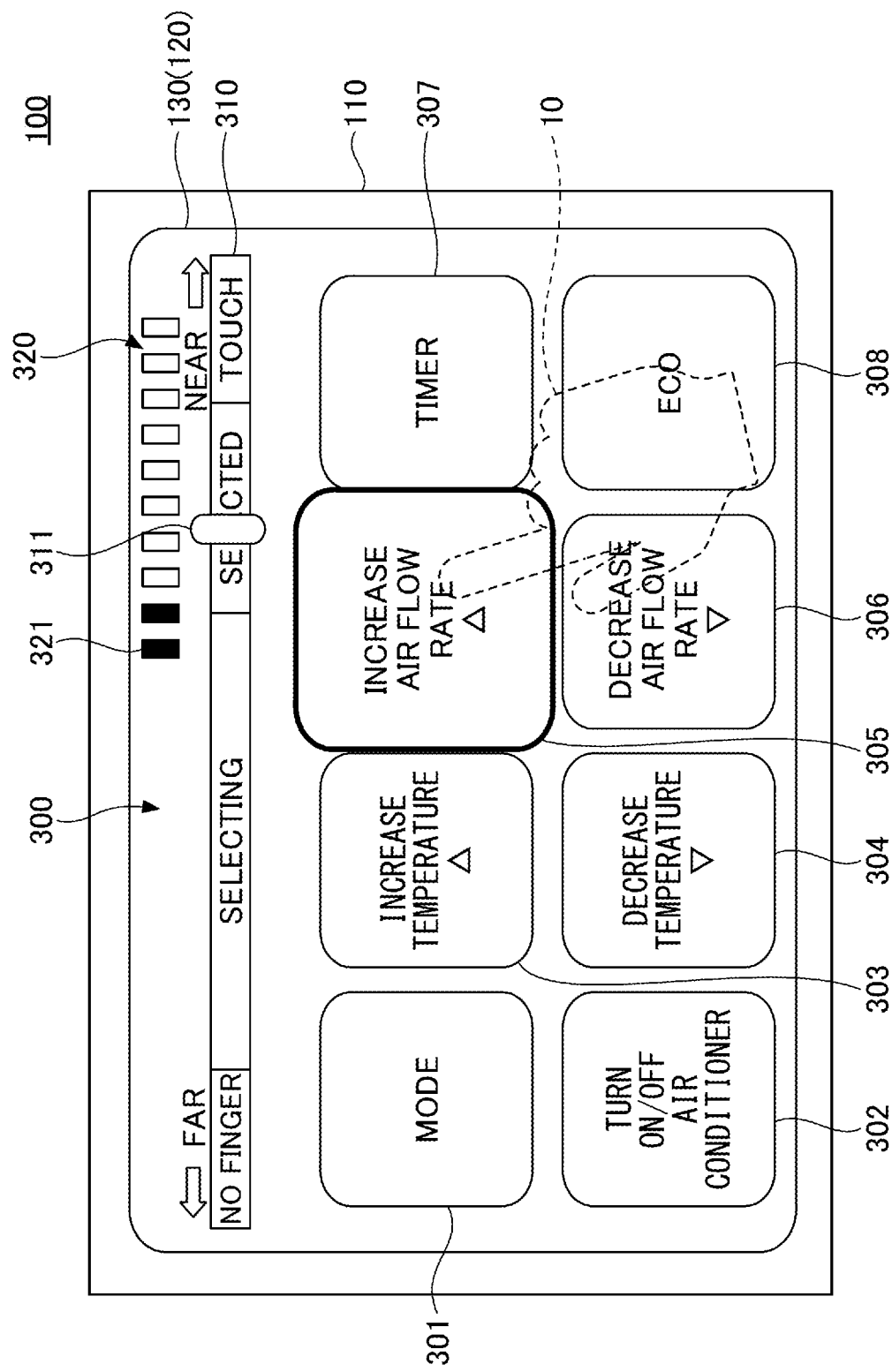
FIG. 12 is a diagram illustrating an example of the selection confirming operation performed by the input device according to the first embodiment of the present invention.

As illustrated in FIG. 12, when the distance between the operation surface 130A and the hand 10 is within a second predetermined proximity range, the slider 311 of the proximity bar 310 displayed on the operation screen 300 is positioned in a "selected" area that corresponds to the second predetermined proximity range, and the input device 100 starts counting the duration of the hover input. The scales 321 of the indicator 320 displayed on the operation screen 300 are sequentially illuminated while the hover input is continued. That is, in the indicator 320, the number of scales 321 corresponding to the duration of the hover input is illuminated. Accordingly, the indicator 320 allows the operator to visually recognize the duration of the hover input and the amount of time remaining before the selection of the input key 305 by the hover input is confirmed.

Figure 13:
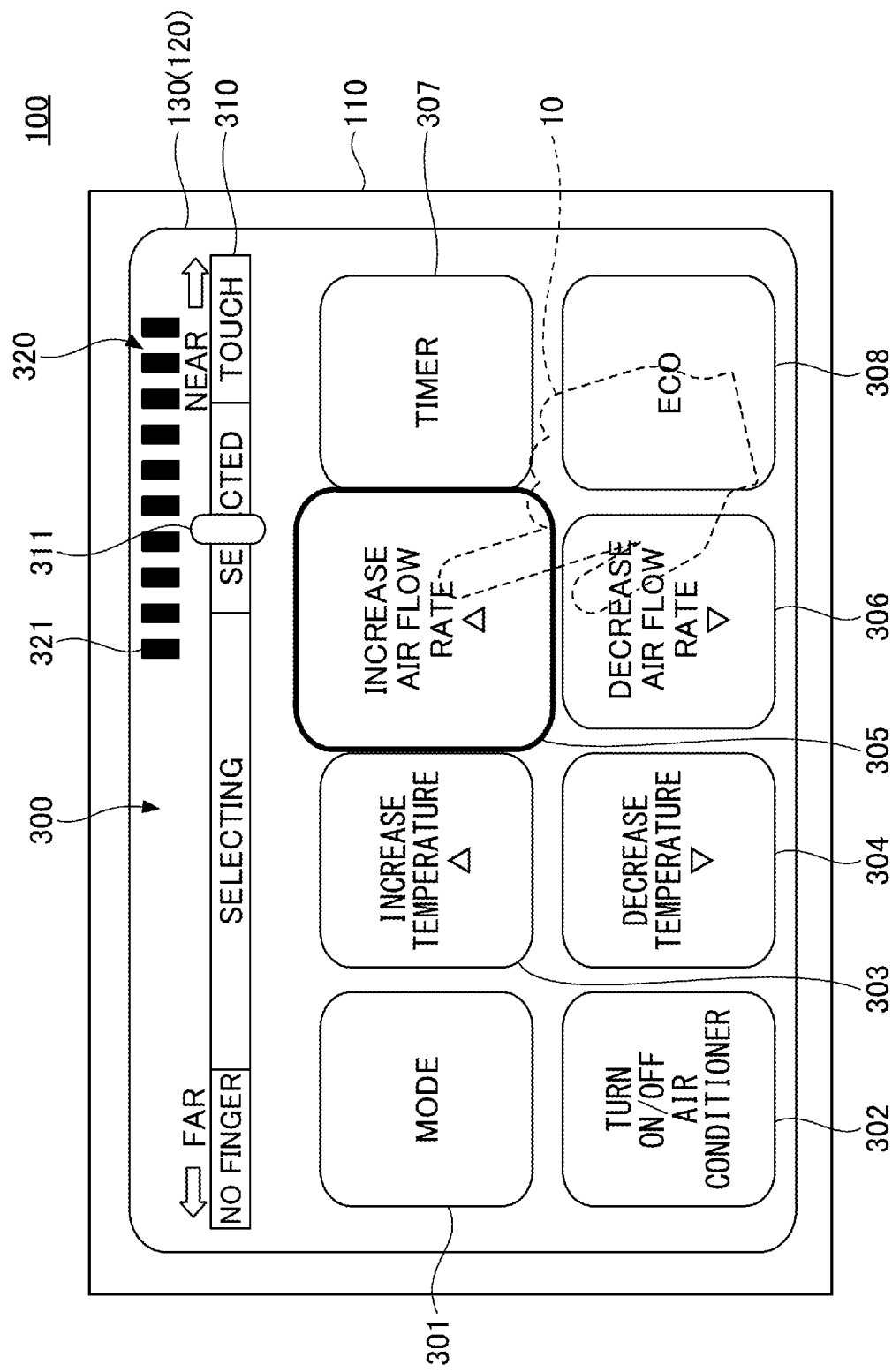
FIG. 13 is a diagram illustrating an example of the selection confirming operation performed by the input device according to the first embodiment of the present invention.

As illustrated in FIG. 13, when the duration of the hover input reaches the predetermined threshold (for example, a count of 10), all the scales 321 of the indicator 320 are illuminated, and the selection of the input key 305 is confirmed. Accordingly, the input device 100 outputs a control signal corresponding to the input key 305 (for example, a control signal for increasing the air flow rate of an air conditioner) to an operation target device (such as the air conditioner) of the input device 100.

In a case where the input key 305 continues to be selected by the hover input after the selection of the input key 305 is confirmed, the input device 100 resets the count and restarts counting the duration of the hover input. Then, when the duration of the hover input reaches the predetermined threshold, the input device 100 confirms the selection of the input key 305 in this case as well. That is, the input device 100 can continuously confirm the selection of the input key 305 by the hover input multiple times.

Figure 14:
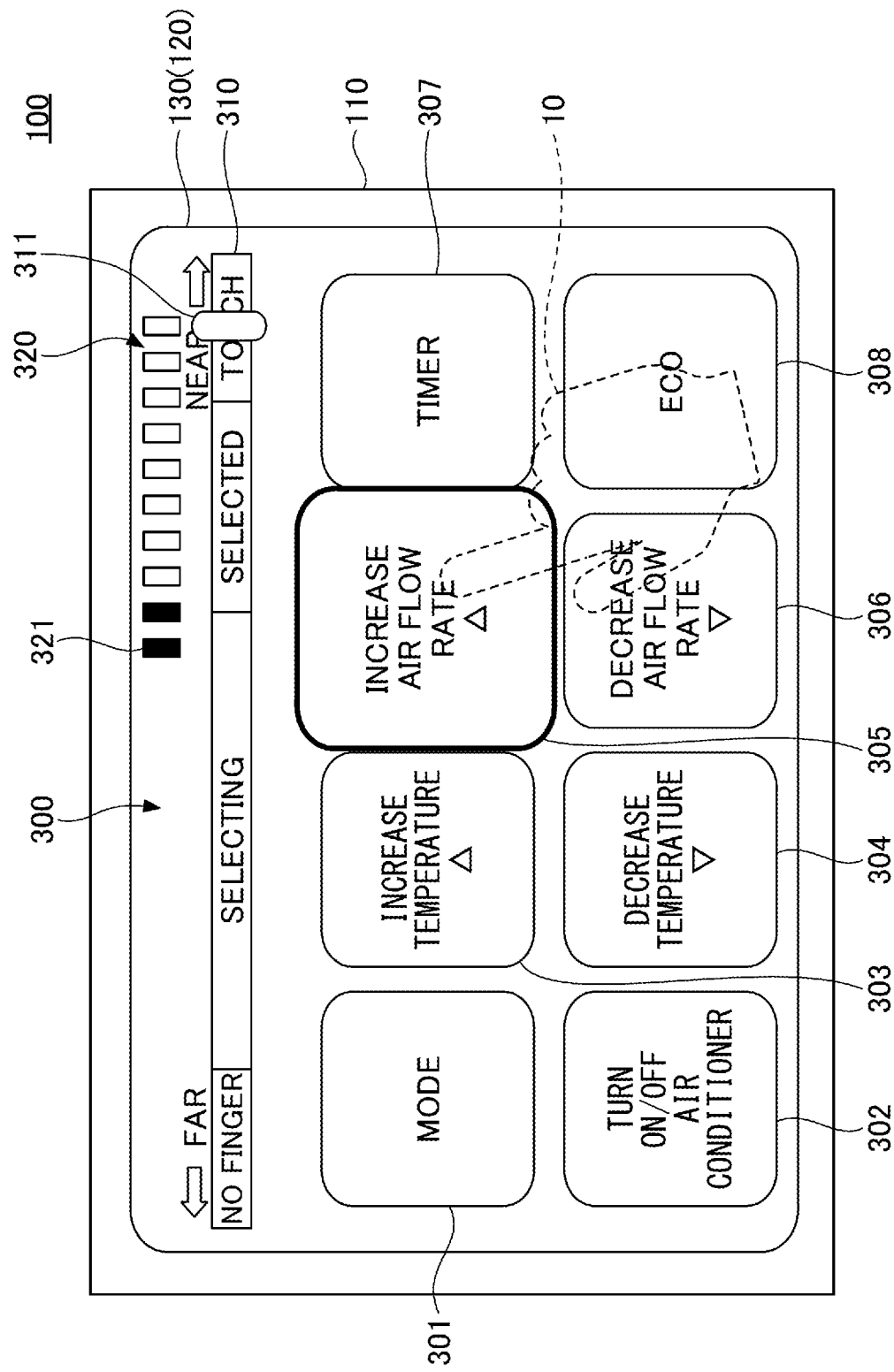
FIG. 14 is a diagram illustrating an example of the selection confirming operation performed by the input device according to the first embodiment of the present invention.

As illustrated in FIG. 14, in a case where a touch input is performed by the operator on the input key 305, the slider 311 of the proximity bar 310 of the operation screen 300 is positioned in a "touch" area that corresponds to a touch position, and the input device 100 immediately confirms the selection of the input key 305 by the touch input. Accordingly, the operator can cause the selection of the input key 305 to be immediately confirmed without waiting until the duration of the hover input reaches the predetermined threshold.

As described above, in a case where a touch input is detected on a selection item before the duration during which the selection item is selected by a hover input reaches the predetermined threshold, the input device 100 according to the first embodiment can immediately confirm the selection of the selection item by the touch input. That is, the input device 100 according to the first embodiment can accelerate the confirmation of the selection of a selection item as necessary in a case where a touch input is performed on the selection item before the selection of the selection item by a hover input is confirmed. Accordingly, the input device 100 according to the first embodiment can quickly execute a function selected by a touch input before the selection of the same function by a hover input is confirmed.

Further, the input device 100 according to the first embodiment can cause the display device 120 to display the indicator 320 including the scales 321 (an example of an "area representing the duration"), while a hover input is continued. As the duration of the hover input increases, the number of illuminated scales 321 gradually increases. Accordingly, the input device 100 according to the first embodiment allows the operator to visually recognize the duration of the hover input and the amount of time remaining before the selection of an input key by the hover input is confirmed.

Further, in a case where a hover input or a touch input is continued, the input device 100 according to the first embodiment can confirm the selection of an input key each time the duration of the hover input or the touch input reaches a predetermined threshold. Therefore, the input device 100 according to the first embodiment can continuously confirm the selection of the input key. Specifically, the input device 100 according to the 20 first embodiment can cause a time interval at which the selection of an input key is continuously confirmed to be different between a hover input and a touch input. Further, the input device 100 according to the first embodiment can set a time interval at which the selection of an input key is continuously confirmed by a touch input to be shorter than a time interval at which the selection of an input key is continuously confirmed by a hover input. Accordingly, when the selection of an input key is continuously confirmed by a hover input, the input device 100 according to the first embodiment can set a relatively long time interval, thereby reducing erroneous inputs. Further, when the selection of an input key is continuously confirmed by a touch input, the input device 100 according to the first embodiment can set a relatively short time interval, thereby allowing the operator to quickly and continuously perform an input.

Further, in a case where the selection of a selection item by a hover input or by a touch input is continuously confirmed, the input device 100 according to the first embodiment can set the predetermined threshold to be lower when the selection of the selection time is confirmed for the second and subsequent times than when the selection of the selection time is confirmed for the first time. Accordingly, for example, even in the case of a hover input, the input device 100 according to the first embodiment allows the operator to quickly and continuously perform a hover input for the second and subsequent times.

Further, in the input device 100 according to the first embodiment, the confirmation unit 144 can disable the selection of an input key by a touch input detected for the first time after confirming the selection of the input key by a hover input (see step S810 of FIG. 8).

Accordingly, in a case where the operator selects an input key by a touch input without recognizing that the selection of the input key by a hover input has been confirmed, the input device 100 according to the first embodiment can disable the touch input, thereby preventing the same input key from being selected twice.

Further, in the input device 100 according to the first embodiment, the display control unit 143 can cause the display device 120 to display the predetermined standby screen 200 while the operator's hand 10 is not in proximity, and causes the display device 120 to display the operation screen 300 including the input keys 301 through 308 while the operator's hand 10 is in proximity.

Accordingly, for example, the input device 100 according to the first embodiment can reduce power consumption in a standby state, display useful information in a standby state, and so on.

(Modification of Selection Confirming Operation Performed by Input Device 100)

Figure 15:
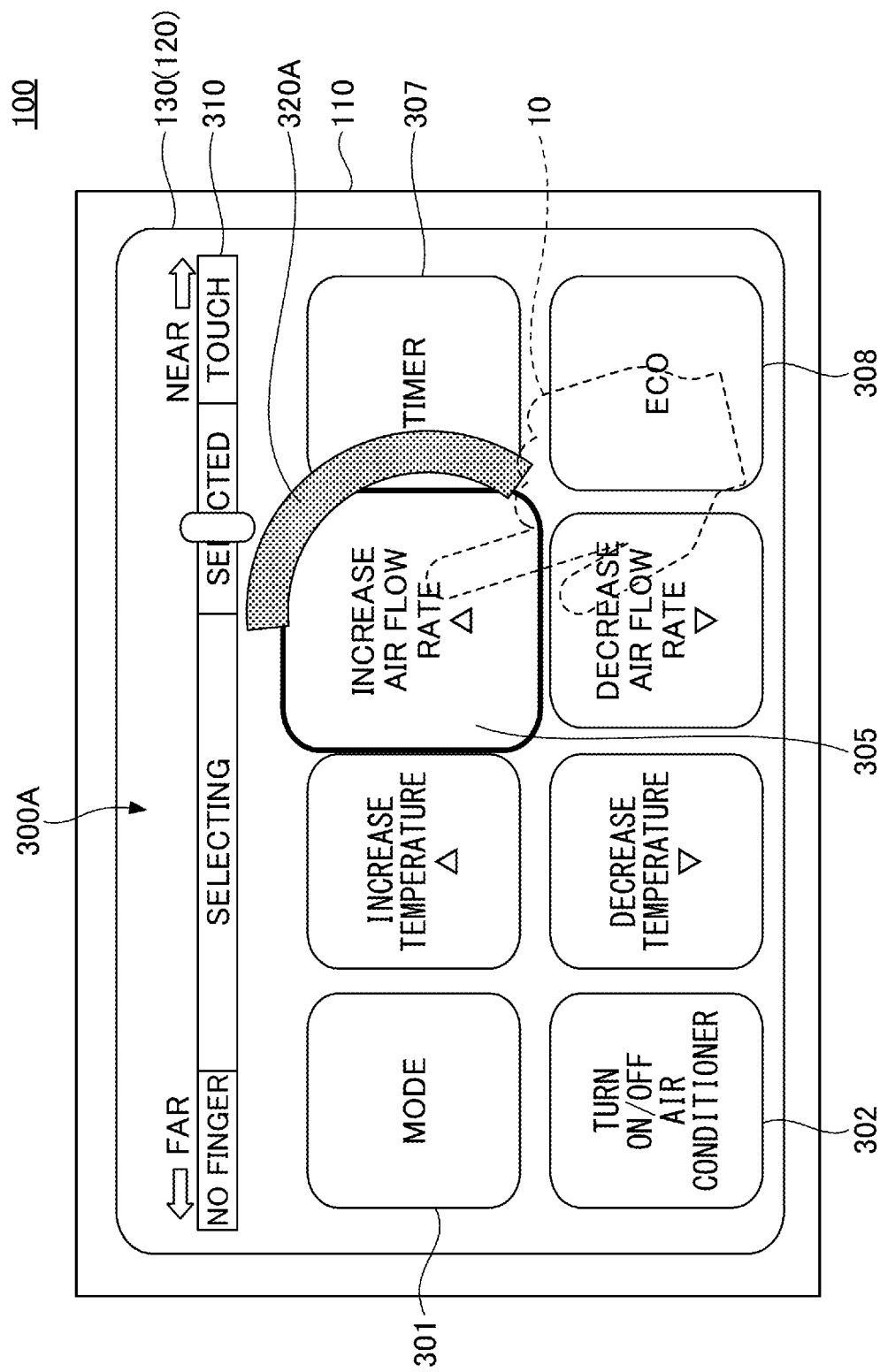
FIG. 15 is a diagram illustrating a modification of the selection confirming operation performed by the input device according to the first embodiment of the present invention.
Figure 16:
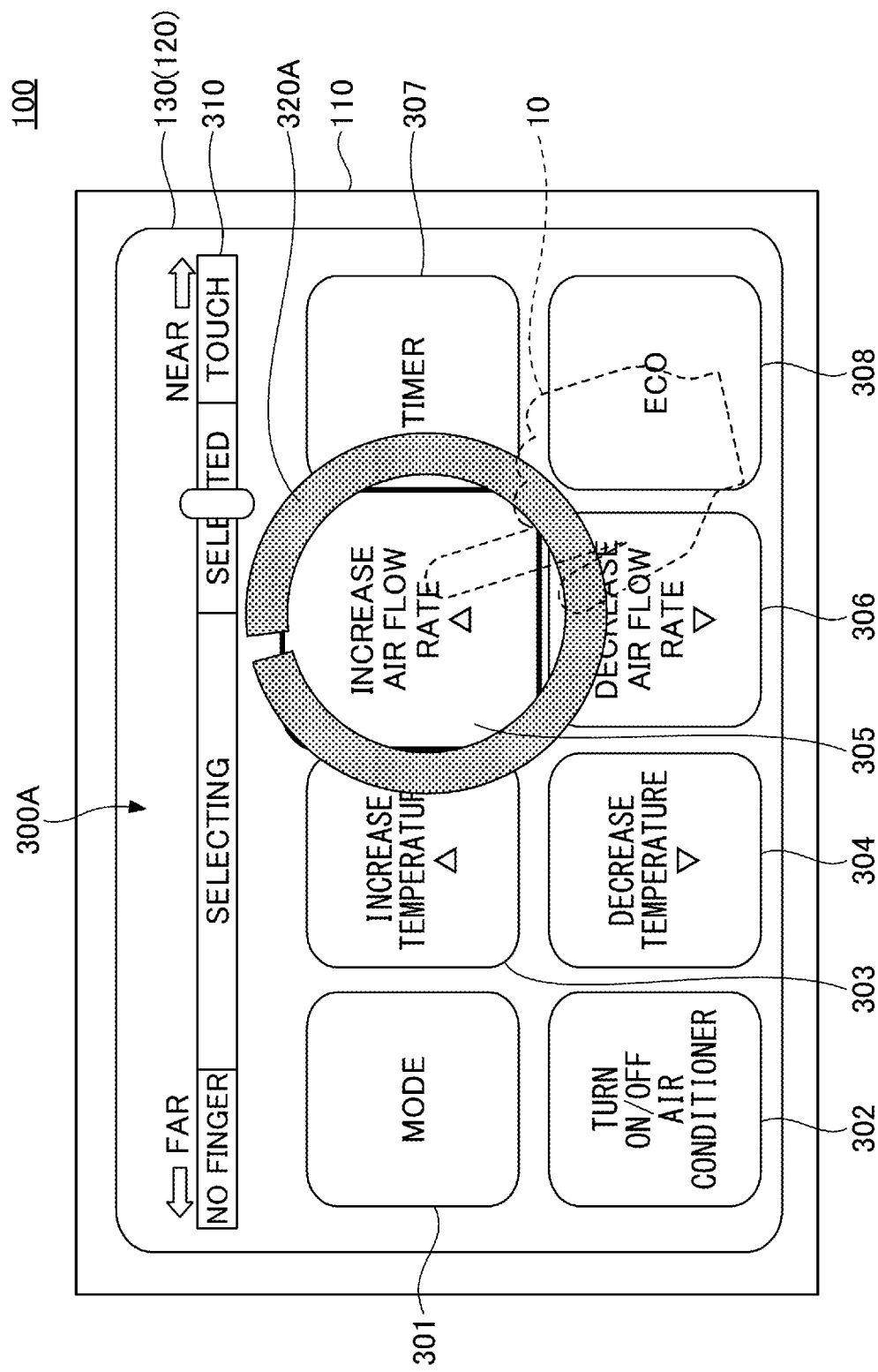
FIG. 16 is a diagram illustrating the modification of the selection confirming operation performed by the input device according to the first embodiment of the present invention.

FIG. 15 and FIG. 16 are diagrams illustrating a modification of the selection confirming operation performed by the input device 100 according to the first embodiment of the present invention. An operation screen 300A illustrated in FIG. 15 and FIG. 16 differs from the operation screen 300 illustrated in FIG. 11 through FIG. 14 in that the indicator 320A is displayed instead of the indicator 320.

As illustrated in FIG. 15, when the distance between the operation surface 130A and the operator's hand 10 is within the second predetermined proximity range, the indicator 320A on the operation screen 300A is gradually formed into an annular shape while a hover input continues. The indicator 320A is displayed at a position where the indicator 320A overlaps with the input key 305 on the operation screen 300A. The indicator 320A is another example of the "display object". As the duration of the hover input increases, the length of the indicator 320A (another example of the "area representing the duration") gradually increases. As illustrated in FIG. 16, when the duration of the hover input reaches the predetermined threshold, the indicator 320A becomes an approximately annular shape, and the selection of the input key 305 is confirmed. The indicator 320A allows the operator to visually recognize the duration of the hover input and the amount of time remaining before the selection of the input key 305 by the hover input is confirmed.

Second Embodiment

In the following, an input device 100A according to a second embodiment will be described. In the following description of the input device 100A according to the second embodiment, only the differences from the input device 100 according to the first embodiment will be described.

(Example of Main Process)

Figure 17:
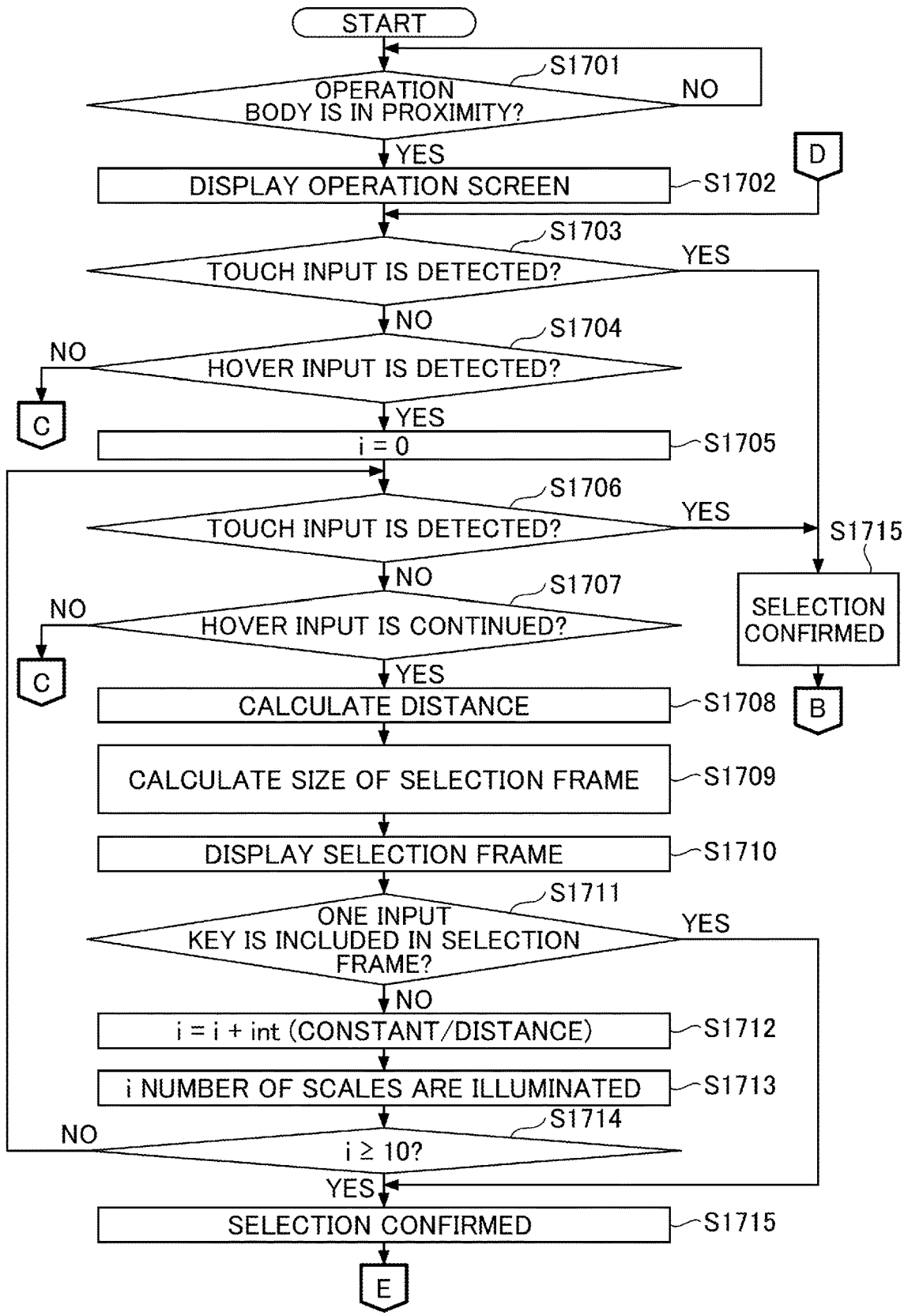
FIG. 17 is a flowchart illustrating an example of a main process performed by the controller according to a second embodiment of the present invention.

FIG. 17 is a flowchart illustrating an example of a main process performed by the controller 140 according to the second embodiment of the present invention.

First, the operation detecting unit 142 determines whether the operation body is in proximity to the operation surface 130A of the touch panel 130 based on a capacitance detection signal obtained by the detection signal obtaining unit 141 (step S1701).

If the operation detecting unit 142 determines that the operation body is not in proximity in step S1701 (no in step S1701), the operation detecting unit 142 performs step S1701 again.

Conversely, if the operation detecting unit 142 determines that the operation body is in proximity in step S1701 (yes in step S1701), the display control unit 143 causes the display device 120 to display the operation screen 300 illustrated in FIG. 3 (step S1702).

Next, the operation detecting unit 142 determines whether a touch input is detected on any of the input keys 301 through 308 (see FIG. 3), displayed on the operation screen 300, based on a capacitance detection signal obtained by the detection signal obtaining unit 141 (step S1703).

If the operation detecting unit 142 determines that a touch input is detected on any of the input keys 301 through 308 in step S1703 (yes in S1703), the confirmation unit 144 confirms the selection of any of the input keys 301 through 308 by the touch input (step S1715). Then, the controller 140 causes the process to proceed to step S901 in the flowchart of FIG. 9.

Conversely, if the operation detecting unit 142 determines that a touch input is not detected on any of the input keys 301 through 308 in step S1703 (no in S1703), the operation detecting unit 142 determines whether a hover input is detected with respect to the operation screen 300 based on a capacitance detection signal obtained by the detection signal obtaining unit 141 (step S1704).

If the operation detecting unit 142 determines that a hover input is not detected with respect to the operation screen 300 in step S1704 (no in step S1704), the controller 140 causes the process to proceed to step S1001 in the flowchart of FIG. 10.

Conversely, if the operation detecting unit 142 determines that a hover input is detected with respect to the operation screen 300 in step S1704 (yes in step S1704), the confirmation unit 144 sets a variable i to "0" (step S1705). The variable i represents the count of the duration of the hover input.

Next, the operation detecting unit 142 determines whether a touch input is detected on any of the input keys 301 through 308, displayed on the operation screen 300, based on a capacitance detection signal obtained by the detection signal obtaining unit 141 (step S1706).

If the operation detecting unit 142 determines that a touch input is detected on any of the input keys 301 through 308 in step S1706 (yes in step S1706), the confirmation unit 144 confirms the selection of any of the input keys 301 through 308 by the touch input (step S1715). Then, the controller 140 causes the process to proceed to step S901 in the flowchart of FIG. 9.

Conversely, if the operation detecting unit 142 determines that a touch input is not detected on any of the input keys 301 through 308 in step S1706 (no in step S1706), the operation detecting unit 142 determines whether the hover input detected in step S1704 is continued based on a capacitance detection signal obtained by the detection signal obtaining unit 141 (step S1707).

If the operation detecting unit 142 determines that the hover input is not continued in step S1707 (no in step S1707), the controller 140 causes the process to proceed to step S1001 in the flowchart of FIG. 10.

Conversely, if the operation detecting unit 142 determines that the hover input is continued in step S1707 (yes in step S1707), the operation detecting unit 142 calculates the distance between the operation body and the operation surface 130A of the touch panel 130 based on a capacitance value at the touch panel 130 (step S1708). Then, the operation detecting unit 142 calculates the size of a selection frame in accordance with the distance calculated in step S1708 (step S1709). In this example, the operation detecting unit 142 calculates the size of the selection frame, such that the smaller the distance calculated in step S1708 is, the smaller the size of the selection frame is. Further, the display control unit 143 superimposes and displays an image of the selection frame, having the size calculated in step S1709, on the operation screen 300 (step S1710).

Next, the operation detecting unit 142 determines whether one input key is included in the selection frame (step S1711).

If the operation detecting unit 142 determines that one input key is included in the selection frame in step S1711 (yes in step S1711), the confirmation unit 144 confirms the selection of the one input key included in the selection frame (step S1715). Then, the controller 140 causes the process to proceed to step S1801 in a flowchart of FIG. 18.

Conversely, if the operation detecting unit 142 determines that one input key is not included in the selection frame in step S1711 (no in step S1711), the confirmation unit 144 adds the calculated value of {int (constant/distance)} to the variable i (step S1712). Then, the display control unit 143 causes the i number of scales 321 displayed on the operation screen 300 to be illuminated (step S1713).

Further, the confirmation unit 144 determines whether the variable i is greater than or equal to "10" (step S1714).

If the confirmation unit 144 determines that the variable i is not greater than or equal to "10" in step S1714 (no in S1714), the controller 140 causes the process to return to step S1706.

Conversely, if the confirmation unit 144 determines that the variable i is greater than or equal to "10" in step S1714 (yes in S1714), the confirmation unit 144 confirms the selection of one input key located at the center of the selection frame (step S1715). Then, the controller 140 causes the process to proceed to step S1801 in the flowchart of FIG. 18.
(Example of Process Performed After Selection by Hover Input is Confirmed)

Figure 18:
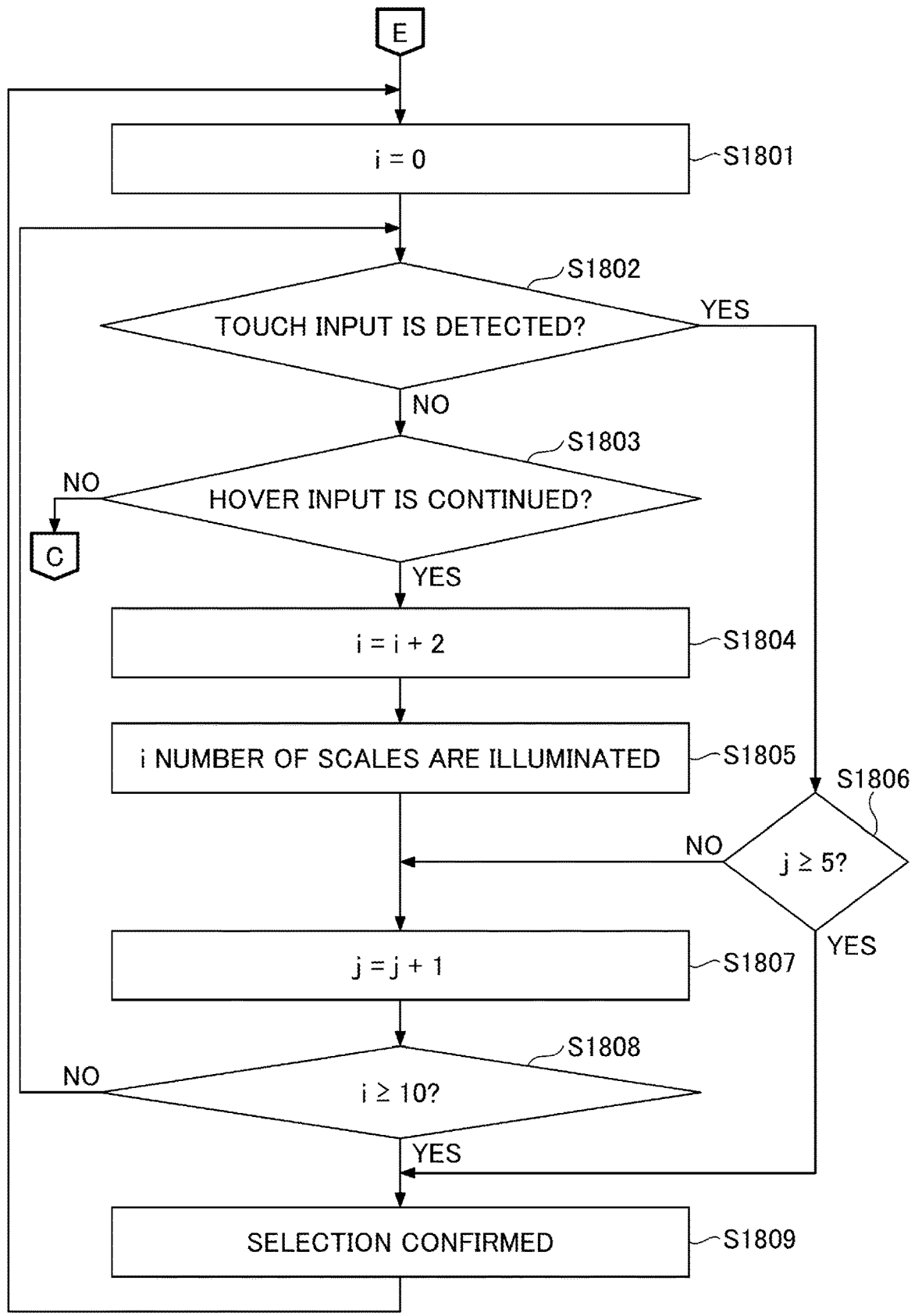
FIG. 18 is a flowchart illustrating an example of a process performed by the controller after the selection by a hover input is confirmed according to the second embodiment of the present invention.

FIG. 18 is a flowchart illustrating an example of a process performed by the controller 140 after the selection by the hover input is confirmed according to the second embodiment of the present invention.

First, the confirmation unit 144 sets each of the variable i and a variable j to "0" (step S1801). Next, the operation detecting unit 142 determines whether a touch input is detected on any of the input keys 301 through 308, displayed on the operation screen 300, based on a capacitance detection signal obtained by the detection signal obtaining unit 141 (step S1802).

If the operation detecting unit 142 determines that a touch input is detected on any of the input keys 301 through 308 in step S1802 (yes in step S1802), the confirmation unit 144 determines whether the variable j is greater than or equal to "5" (step S1806).

If the confirmation unit 144 determines that the variable j is greater than or equal to "5" in step S1806 (yes in step S1806), the confirmation unit 144 confirms the selection of any of the input keys 301 through 308 by the touch input (step S1809). Then, the controller 140 causes the process to return to step S1801.

Conversely, if the confirmation unit 144 determines that the variable j is not greater than or equal to "5" in step S1806 (no in step S1806), the controller 140 causes the process to proceed to S1807.

If the operation detecting unit 142 determines that a touch input is not detected on any of the input keys 301 through 308 in step S1802 (no in step S1802), the operation detecting unit 142 determines whether the hover input is continued based on a capacitance detection signal obtained by the detection signal obtaining unit 141 (step S1803).

If the operation detecting unit 142 determines that the hover input is not continued in step S1803 (no in step S1803), the controller 140 causes the process to proceed to step S1001 in the flowchart of FIG. 10.

Conversely, if the operation detecting unit 142 determines that the hover input is continued in step S1803 (yes in step S1803), the confirmation unit 144 adds "2" to the variable i (step S1804). Then, the display control unit 143 causes the i number of scales 321 displayed on the operation screen 300 to be illuminated (step S1805). Then, the controller 140 causes the process to proceed to step S1807.

The confirmation unit 144 adds "1" to the variable j (step S1807). Next, the confirmation unit 144 determines whether the variable i is greater than or equal to "10" (step S1808).

If the confirmation unit 144 determines that the variable i is not greater than or equal to "10" in step S1808 (no in step S1808), the controller 140 causes the process to return to step S1802.

Conversely, if the confirmation unit 144 determines that the variable i is greater than or equal to "10" in step S1808 (yes in S1808), the confirmation unit 144 confirms the selection of any of the input keys 301 through 308 by the hover input (step S1809). Then, the controller 140 causes the process to return to step S1801.
(Example of Selection Confirming Operation)

Figure 19:
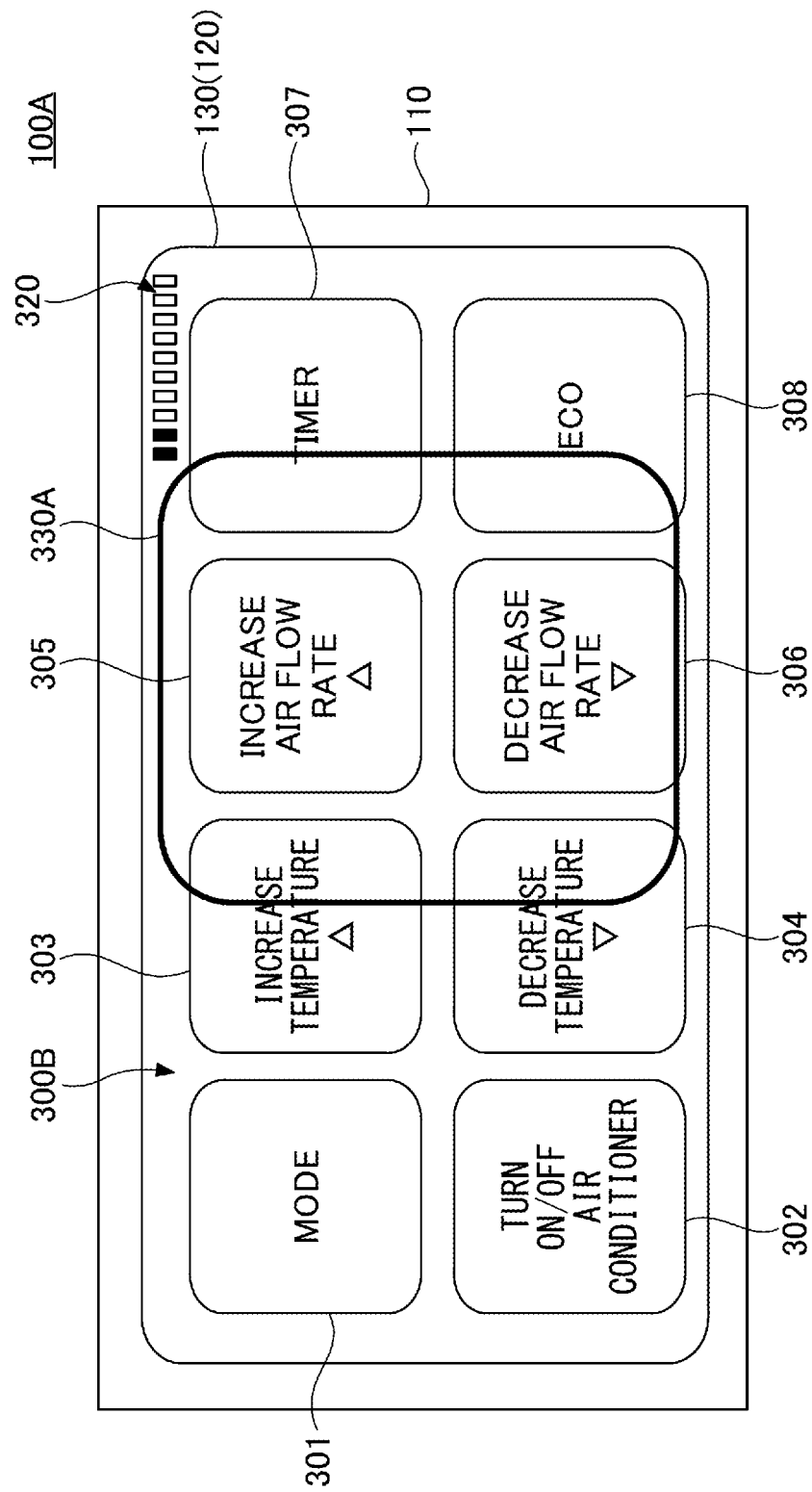
FIG. 19 is a diagram illustrating an example of a selection confirming operation performed by an input device according to the second embodiment of the present invention.
Figure 20:
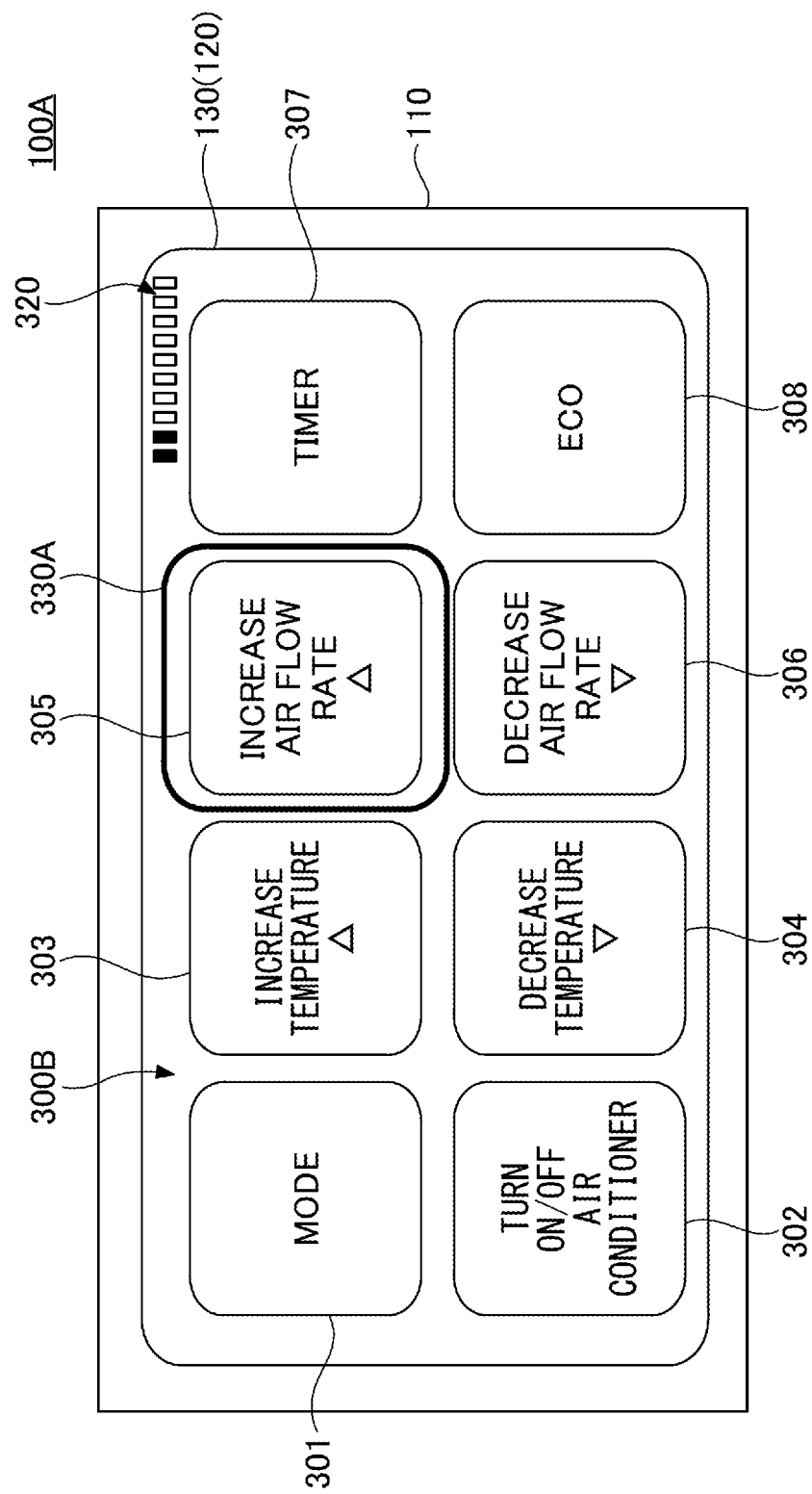
FIG. 20 is a diagram illustrating an example of the selection confirming operation performed by the input device according to the second embodiment of the present invention.

FIG. 19 and FIG. 20 are diagrams illustrating examples of a selection confirming operation performed by the input device 100A according to the second embodiment of the present invention. An operation screen 300B illustrated in FIG. 19 and FIG. 20 differs from the operation screen 300 illustrated in FIG. 11 through FIG. 14 in that the operation screen 300B does not include the proximity bar 310. Further, a selection frame 330A having a rectangular shape is superimposed and displayed on the operation screen 300B.

The selection frame 330A is displayed on the operation screen 300B so as to overlap with the detected position of a hover input, while the hover input is performed by the operator's hand 10. The size of the selection frame 330A changes in accordance with the distance between the operation surface 130A of the touch panel 130 and the operator's hand 10. The size of the selection frame 330A decreases as the distance between the operation surface 130A and the operator's hand 10 decreases. Further, the display position of the selection frame 330A on the operation screen 300B moves as the operator's hand 10 moves in a direction parallel to the operation screen 300B. Accordingly, the center position of the selector frame 330A always overlaps with the detected position of the operator's hand 10.

In the example illustrated in FIG. 19, the operator's hand 10 performing a hover input is relatively distant from the operation surface 130A. Therefore, the size of the selection frame 330A is relatively large. In the example illustrated in FIG. 20, the operator's hand 10 performing a hover input is relatively close to the operation surface 130A. Therefore, the size of the selection frame 330A is relatively small.

In the example illustrated in FIG. 19, a plurality of input keys are included in the selection frame 330A. Therefore, the input device 100A does not confirm the selection of any of the input keys until the duration of the hover input reaches a predetermined threshold. In this case, the input device 100A confirms the selection of an input key located at the center of the selection frame 330A when the duration of the hover input reaches the predetermined threshold.

In the example illustrated in FIG. 20, only the one input key 305 is included in the selection frame 330A. Therefore, the input device 100A confirms the selection of the input key 305 at the time when only the one input key 305 is included in the selection frame 330A. That is, the operator can decrease the size of the selection frame 330A by bringing the hand 10 close to one desired input key such that the desired input key is included in the selection frame 330A. In this manner, the operator can cause the input device 100A to confirm the selection of the input key 305 without waiting until the duration of the hover input reaches the predetermined threshold.

As described above, in the input device 100A according to the second embodiment, the display control unit 143 can cause the display device 120 to display the selection frame 330A when a hover input is performed. The size of the selection frame 330A indicates the distance between the hand 10 and the operation surface 130A of the touch panel 130.

Accordingly, the input device 100A according to the second embodiment allows the operator to visually recognize the distance between the hand 10 and the operation surface 130A of the touch panel 130.

In particular, in the input device 100A according to the second embodiment, the display control unit 143 can cause the display device 120 to display the selection frame 330A whose size decreases as the distance between the hand 10 and the operation surface 130A of the touch panel 130 decreases. Then, in response to one input key being included in the selection frame 330A, the confirmation unit 144 can confirm the selection of the one input key.

Accordingly, the input device 100A according to the second embodiment can quickly confirm the selection of an input key by a hover input.

Further, in the input device 100A according to the second embodiment, the confirmation unit 144 can decrease the predetermined threshold, used to confirm the selection of an input key, as the distance between the operator's hand 10 and the operation surface 130A of the touch panel 130 decreases (see step S1712 of FIG. 17).

Accordingly, in the input device 100A according to the second embodiment, as the distance between the hand 10 and, the operation surface 130A of the touch panel 130 decreases, the likelihood that the operator has erroneously performed a hover input also decrease. Therefore, the input device 100A according to the second embodiment can reduce erroneous inputs while allowing the selection of an input key to be confirmed in a shorter period of time.

Further, in the input device 100A according to the second embodiment, the confirmation unit 144 can disable the selection of the input key by a touch input for a certain period of time after confirming the selection of an input key by a hover input (see step S1806 of FIG. 18).

Accordingly, in a case where the operator selects an input key by a touch input without recognizing that the selection of the input key by a hover input has been confirmed, the input device 100A according to the second embodiment can disable the touch input, thereby preventing the same input key from being selected twice.

Third Embodiment

In the following, an input device 100B according to a third embodiment will be described. In the following description of the input device 100B according to the third embodiment, only the differences from the input device 100 according to the first embodiment will be described.
(Example of Main Process)

Figure 21:
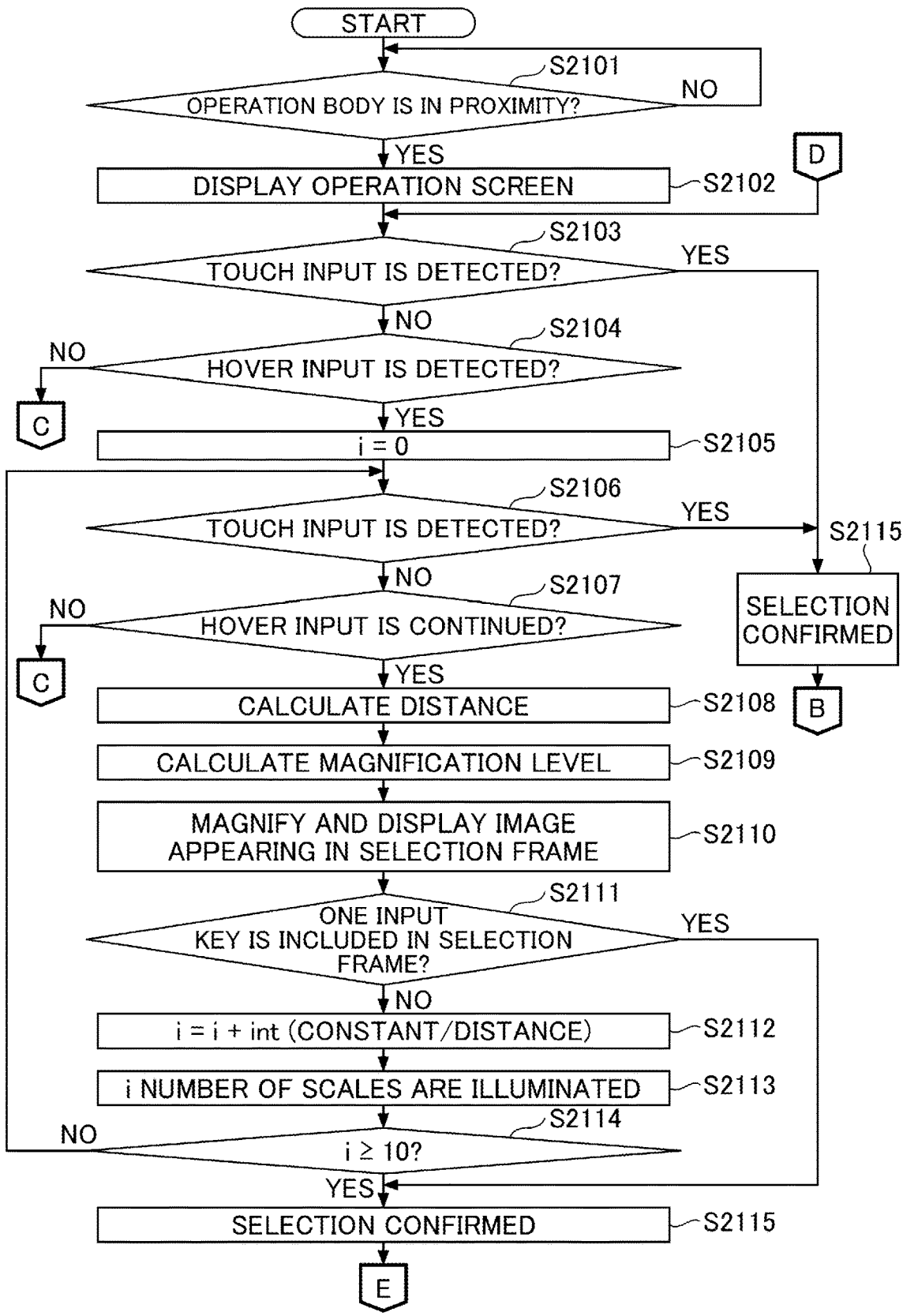
FIG. 21 is a flowchart illustrating an example of a main process performed by the controller according to a third embodiment of the present invention.

FIG. 21 is a flowchart illustrating an example of a main process performed by the controller 140 according to the third embodiment of the present invention.

First, the operation detecting unit 142 determines whether the operation body is in proximity to the operation surface 130A of the touch panel 130 based on a capacitance detection signal obtained by the detection signal obtaining unit 141 (step S2101).

If the operation detecting unit 142 determines that the operation body is not in proximity in step S2101 (no in step S2101), the operation detecting unit 142 performs step S2101 again.

Conversely, if the operation detecting unit 142 determines that the operation body is in proximity in step S2101 (yes in step S2101), the display control unit 143 causes the display device 120 to display the operation screen 300 illustrated in FIG. 3 (step S2102).

Next, the operation detecting unit 142 determines whether a touch input is detected on any of the input keys 301 through 308 (see FIG. 3), displayed on the operation screen 300, based on a capacitance detection signal obtained by the detection signal obtaining unit 141 (step S2103).

If the operation detecting unit 142 determines that a touch input is detected on any of the input keys 301 through 308 in step S2103 (yes in S2103), the confirmation unit 144 confirms the selection of any of the input keys 301 through 308 by the touch input (step S2115). Then, the controller 140 causes the process to proceed to step S901 in the flowchart of FIG. 9.

Conversely, if the operation detecting unit 142 determines that a touch input is not detected on any of the input keys 301 through 308 in step S2103 (no in S2103), the operation detecting unit 142 determines whether a hover input is detected with respect to the operation screen 300 based on a capacitance detection signal obtained by the detection signal obtaining unit 141 (step S2104).

If the operation detecting unit 142 determines that a hover input is not detected with respect to the operation screen 300 in step S2104 (no in step S2104), the controller 140 causes the process to proceed to step S1001 in the flowchart of FIG. 10.

Conversely, if the operation detecting unit 142 determines that a hover input is detected with respect to the operation screen 300 in step S2104 (yes in step S2104), the confirmation unit 144 sets a variable i to "0" (step S2105). The variable i represents the count of the duration of the hover input.

Next, the operation detecting unit 142 determines whether a touch input is detected on any of the input keys 301 through 308 displayed on the operation screen 300, based on a capacitance detection signal obtained by the detection signal obtaining unit 141 (step. S2106).

If the operation detecting unit 142 determines that a touch input is detected on any of the input keys 301 through 308 in step S2106 (yes in step S2106), the confirmation unit 144 confirms the selection of any of the input keys 301 through 308 by the touch input (step S2115). Then, the controller 140 causes the process to proceed to step S901 in the flowchart of FIG. 9.

Conversely, if the operation detecting unit 142 determines that a touch input is not detected on any of the input keys 301 through 308 in step S2106 (no in step S2106), the operation detecting unit 142 determines whether the hover input detected in step S2104 is continued based on a capacitance detection signal obtained by the detection signal obtaining unit 141 (step S2107).

If the operation detecting unit 142 determines that the hover input is not continued in step S2107 (no in step S2107), the controller 140 causes the process to proceed to step S1001 in the flowchart of FIG. 10.

Conversely, if the operation detecting unit 142 determines that the hover input is continued in step S2107 (yes in step S2107), the operation detecting unit 142 calculates the distance between the operation body and the operation surface 130A of the touch panel 130 based on a capacitance value at the touch panel 130 (step S2108). Then, the operation detecting unit 142 calculates the magnification level of an image appearing in a selection frame in accordance with the distance calculated in step S2108 (step S2109). In this example, the operation detecting unit 142 calculates the magnification level of the image appearing in the selection frame, such that the smaller the distance calculated in step S2108 is, the larger the magnification level of the image is. Further, the display control unit 143 superimposes and displays an image of the selection frame having a predetermined size on the operation screen 300, and magnifies the image (of a part of the operation screen 300) appearing in the selection frame at the magnification level calculated in step S2109 for display (step S2110).

Next, the operation detecting unit 142 determines whether one input key is included in the selection frame (step S2111).

If the operation detecting unit 142 determines that one input key is included in the selection frame in step S2111 (yes in step S2111), the confirmation unit 144 confirms the selection of the one input key included in the selection frame (step S2115). Then, the controller 140 causes the process to proceed to step S1801 in the flowchart of FIG. 18.

Conversely, if the operation detecting unit 142 determines that one input key is not included in the selection frame in step S2111 (no in step S2111), the confirmation unit 144 adds the calculated value of {int (constant/distance)} to the variable i (step S2112). Then, the display control unit 143 causes the i number of scales 321 displayed on the operation screen 300 to be illuminated (step S2113).

Further, the confirmation unit 144 determines whether the variable i is greater than or equal to "10" (step S2114).

If the confirmation unit 144 determines that the variable i is not greater than or equal to "10" in step S2114 (no in S2114), the controller 140 causes the process to return to step S2106.

Conversely, if the confirmation unit 144 determines that the variable i is greater than or equal to "10" in step S2114 (yes in S2114), the confirmation unit 144 confirms the selection of one input key located at the center of the selection frame (step S2115). Then, the controller 140 causes the process to proceed to step S1801 in the flowchart of FIG. 18.

(Example of Selection Confirming Operation)

Figure 22:
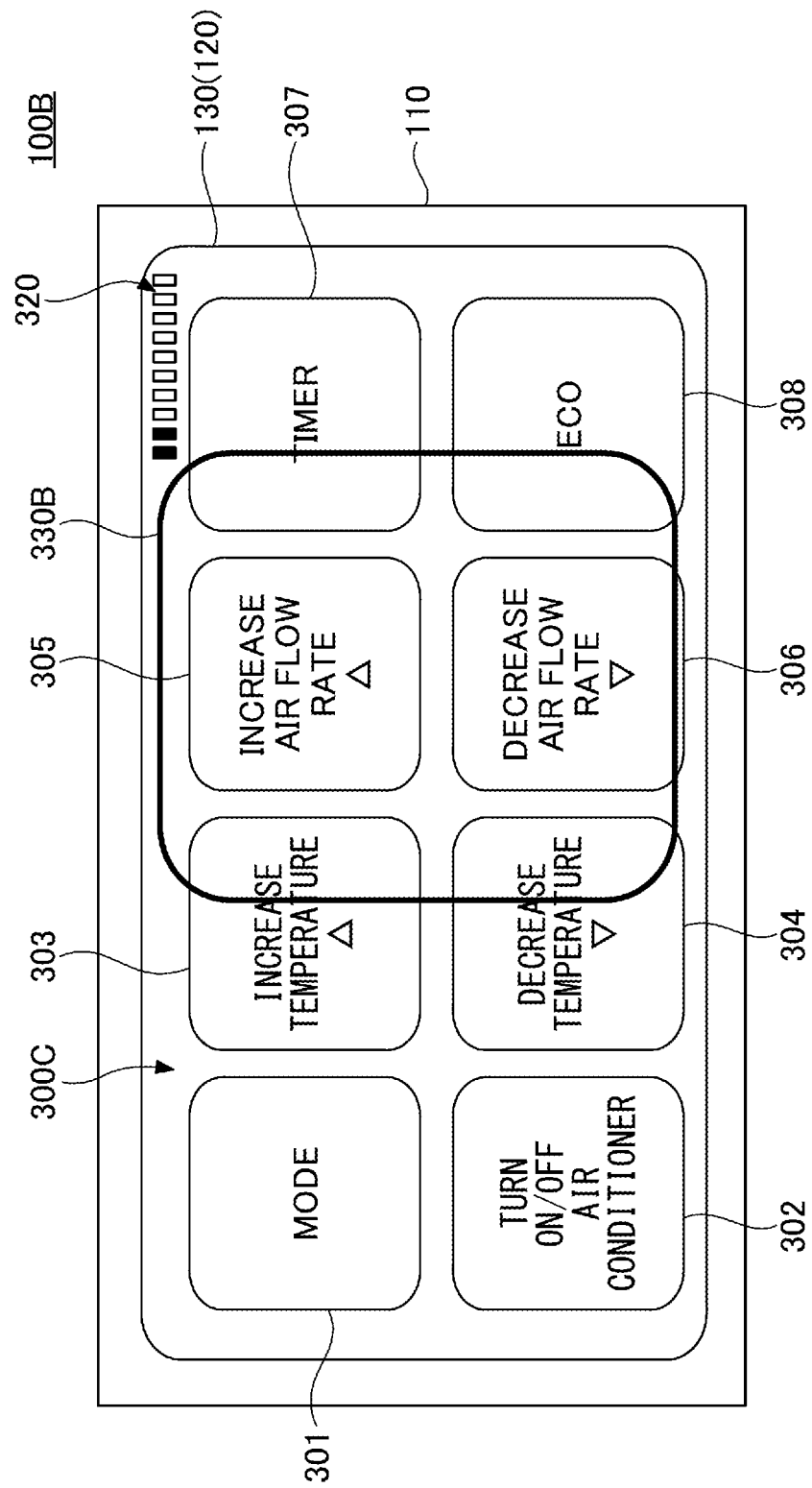
FIG. 22 is a diagram illustrating an example of a selection confirming operation performed by an input device according to the third embodiment of the present invention.
Figure 23:
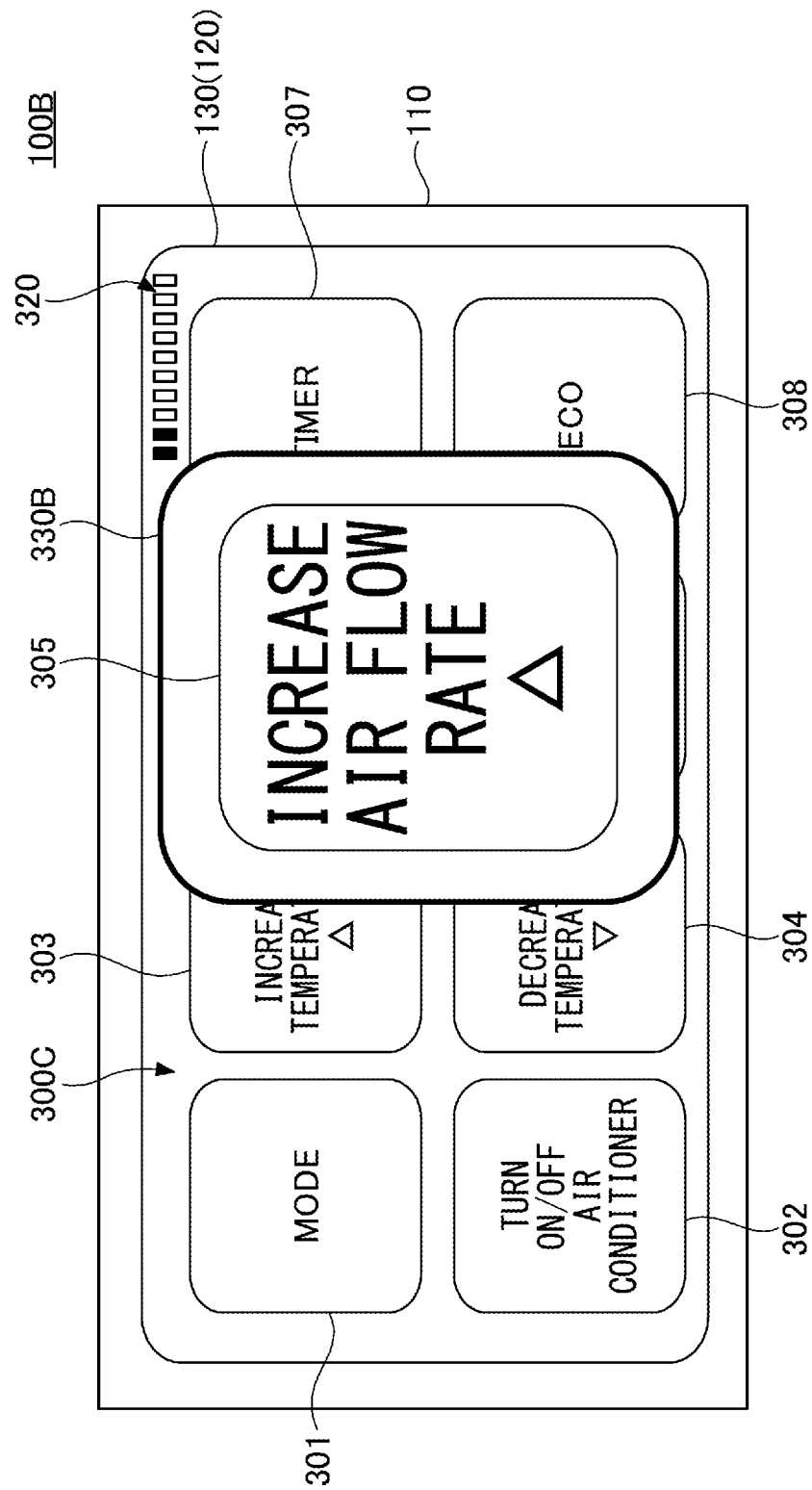
FIG. 23 is a diagram illustrating an example of the selection confirming operation performed by the input device according to the third embodiment of the present invention.

FIG. 22 and FIG. 23 are diagrams illustrating examples of a selection confirming operation performed by the input device 100B according to the third embodiment of the present invention. An operation screen 300C illustrated in FIG. 22 and FIG. 23 differs from the operation screen 300 illustrated in FIG. 11 through FIG. 14 in that the operation screen 300C does not include the proximity bar 310. Further, a selection frame 330B having a rectangular shape is superimposed and displayed on the operation screen 300C.

The selection frame 330B is displayed on the operation screen 300C so as to overlap with the detected position of a hover input, while the hover input is performed by the operator's hand 10. The size of the selection frame 330A is fixed. As the distance between the operation surface 130A and the operator's hand 10 decreases, the magnification level of an image of a part of the operation screen 300C, which appears in the selection frame 330B, decreases. Further, the display position of the selection frame 330B on the operation screen 300C moves as the operator's hand 10 moves in a direction parallel to the operation screen 300C. Accordingly, the center position of the selector frame 330B always overlaps with the detected position of the operator's hand 10.

In the example illustrated in FIG. 22, the operator's hand 10 performing a hover input is relatively distant from the operation surface 130A. Therefore, the magnification level of an image appearing in the selection frame 330B is relatively small. Conversely, in the example illustrated in FIG. 23, the operator's hand 10 performing a hover input is relatively close to the operation surface 130A. Therefore, the magnification level of an image appearing in the selection frame 330B is relatively large.

In the example illustrated in FIG. 22, a plurality of input keys are included in the selection frame 330B. Therefore, the input device 100B does not confirm the selection of any of the input keys until the duration of the hover input reaches a predetermined threshold. In this case, the input device 100B confirms the selection of an input key located at the center of the selection frame 330B when the duration of the hover input reaches the predetermined threshold.

In the example illustrated in FIG. 23, only the one input key 305 is included in the selection frame 330B. Therefore, the input device 100B confirms the selection of the input key 305 at the time when only the one input key 305 is included in the selection frame 330B. That is, the operator can magnify an image appearing in the selection frame 330B by bringing the hand 10 close to one desired input key such that the desired input key is included in the selection frame 330B. In this manner, the operator can cause the input device 100B to confirm the selection of the input key 305 without waiting until the duration of the hover input reaches the predetermined threshold.

As described above, in the input device 100B according to the third embodiment, the display control unit 143 can cause the display device 120 to display the selection frame 330B when a hover input is performed. The magnification level of an image appearing in the selection frame 330B indicates the distance between the hand 10 and the operation surface 130A of the touch panel 130.

Accordingly, the input device 100B according to the third embodiment allows the operator to visually recognize the distance between the hand 10 and the operation surface 130A of the touch panel 130.

In particular, in the input device 100B according to the third embodiment, the display control unit 143 can cause the display device 120 to display the selection frame 330B. The magnification level of an image appearing in the selection frame 330B increases as the distance between the hand 10 and the operation surface 130A of the touch panel 130 decreases. Then, in response to one input key being included in the selection frame 330B, the confirmation unit 144 can confirm the selection of the input key.

Accordingly, the input device 100B according to the third embodiment can quickly confirm the selection of an input key by a hover input.

Further, in the input device 100B according to the third embodiment, the confirmation unit 144 can decrease the predetermined threshold for confirming the selection of an input key as the distance between the hand 10 and the operation surface 130A of the touch panel 130 decreases (see step S2112 of FIG. 21).

Accordingly, in the input device 100B according to the third embodiment, as the distance between the hand 10 and the operation surface 130A of the touch panel 130 decreases, the likelihood that the operator has erroneously performed a hover input also decreases. Therefore, the input device 100B according to the third embodiment can reduce erroneous inputs while allowing the selection of an input key to be confirmed in a shorter period of time.

Fourth Embodiment

In the following, an input device 100C according to a fourth embodiment will be described. In the following description of the input device 100C according to the fourth embodiment, only the differences from the input device 100 according to the first embodiment will be described.
(Example of Main Process)

Figure 24:
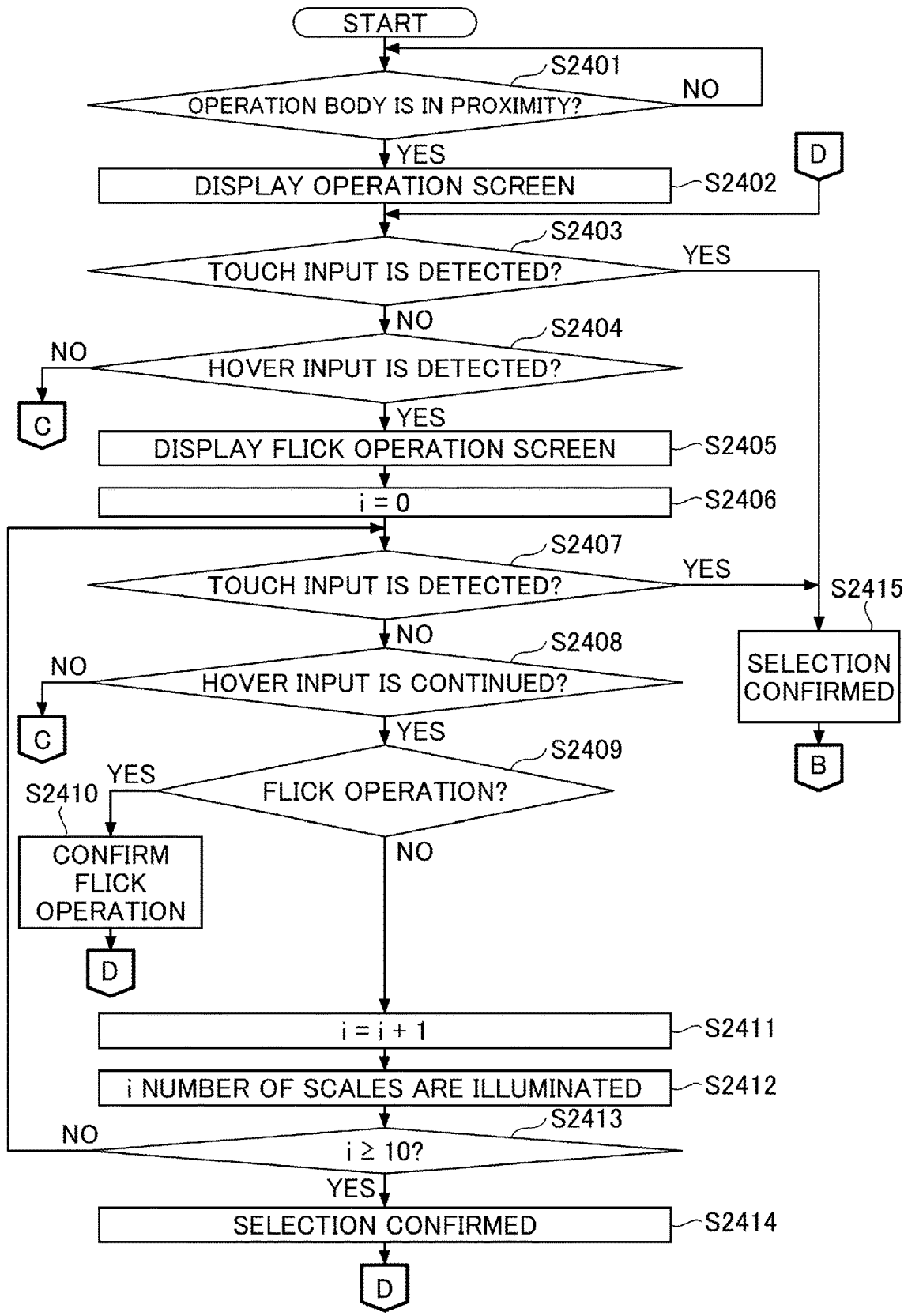
FIG. 24 is a flowchart illustrating an example of a main process performed by the controller according to a fourth embodiment of the present invention.

FIG. 24 is a flowchart illustrating an example of a main process performed by the controller 140 according to the fourth embodiment of the present invention.

First, the operation detecting unit 142 determines whether the operation body is in proximity to the operation surface 130A of the touch panel 130 based on a capacitance detection signal obtained by the detection signal obtaining unit 141 (step S2401).

If the operation detecting unit 142 determines that the operation body is not in proximity in step S2401 (no in step S2401), the operation detecting unit 142 performs step S2401 again.

Conversely, if the operation detecting unit 142 determines that the operation body is in proximity in step S2401 (yesin step S2401), the display control unit 143 causes the display device 120 to display an operation screen 300D illustrated in FIG. 25A through FIG. 25C (step S2402).

Next, the operation detecting unit 142 determines whether a touch input is detected on any of a plurality of input keys (see FIG. 25A through FIG. 25C) displayed on the operation screen 300D, based on a capacitance detection signal obtained by the detection signal obtaining unit 141 (step S2403).

If the operation detecting unit 142 determines that a touch input is detected on any of the input keys in step S2403 (yes in S2403), the confirmation unit 144 confirms the selection of any of the input keys by the touch input (step S2415). Then, the controller 140 causes the process to proceed to step S901 in the flowchart of FIG. 9.

Conversely, if the operation detecting unit 142 determines that a touch input is not detected on any of the input keys in step S2403 (no in S2403), the operation detecting unit 142 determines whether a hover input is detected with respect to any of the input keys displayed on the operation screen 300D, based on a capacitance detection signal obtained by the detection signal obtaining unit 141 (step S2404).

If the operation detecting unit 142 determines that a hover input is not detected with respect to any of the input keys in step S2404 (no in step S2404), the controller 140 causes the process to proceed to step S1001 in the flowchart of FIG. 10.

Conversely, if the operation detecting unit 142 determines that a hover input is detected with respect to any of the input keys in step S2404 (yes in step S2404), the display control unit 143 causes the display device 120 to display an image including a flick operation screen 300E superimposed on the operation screen 300D illustrated in FIG. 25C (step S2405). The flick operation screen 300E displays an enlarged input key, with respect to which the hover input has been detected, and allows the operator to perform a flick operation. Then, the confirmation unit 144 sets a variable i to "0" (step S2406). The variable i represents the count of the duration of the hover input.

Next, the operation detecting unit 142 determines whether a touch input is detected on any of the input keys displayed on the operation screen 300D, based on a capacitance detection signal obtained by the detection signal obtaining unit 141 (step S2407).

If the operation detecting unit 142 determines that a touch input is detected on any of the input keys in step S2407 (yes in step S2407), the confirmation unit 144 confirms the selection of an input key on which the touch input is detected (step S2415). Then, the controller 140 causes the process to proceed to step S901 in the flowchart of FIG. 9.

Conversely, if the operation detecting unit 142 determines that a touch input is not detected on any of the input keys in step. S2407 (no in step S2407), the operation detecting unit 142 determines whether the hover input detected in step S2404 is continued based on a capacitance detection signal obtained by the detection signal obtaining unit 141 (step S2408).

If the operation detecting unit 142 determines that the hover input is not continued in step S2408 (no in step S2408), the controller 140 causes the process to proceed to step S1001 in the flowchart of FIG. 10.

Conversely, if the operation detecting unit 142 determines that the hover input is continued in step S2408 (yes in step S2408), the operation detecting unit 142 determines whether a flick operation is performed on the flick operation screen 300E based on changes in capacitance values at the touch panel 130 (step S2409).

If the operation detecting unit 142 determines that a flick operation is performed in step S2409 (yes in step S2409), the confirmation unit 144 confirms the flick operation (step S2410). Then, the controller 140 causes the process to return to step S2403.

Conversely, if the operation detecting unit 142 determines that a flick operation is not performed in step S2409 (no in step S2409), the confirmation unit 144 adds "1" to the variable i (step S2411). Then, the display control unit 143 causes the i number of scales 321 displayed on the operation screen 300D to be illuminated (step S2412).

Further, the confirmation unit 144 determines whether the variable i is greater than or equal to "10" (step S2413).

If the confirmation unit 144 determines that the variable i is not greater than or equal to "10" in step S2413 (no in S2413), the controller 140 causes the process to return to step S2407.

Conversely, if the confirmation unit 144 determines that the variable i is greater than or equal to "10" in step S2413 (yes in S2413), the confirmation unit 144 confirms the selection of the input key by the hover input (step S2414). Then, the controller 140 causes the process to return to step S2403.

(Example of Selection Confirming Operation)

FIG. 25A through FIG. 25C are diagrams illustrating examples of a selection confirming operation performed by the input device 100C according to the fourth embodiment of the present invention.

FIG. 25A depicts a state in which when the operator's hand 10 is not in proximity to the operation surface 130A of the touch panel 130 in the input device 100C according to the fourth embodiment. As illustrated in FIG. 25A, the input device 100C according to the fourth embodiment causes the display device 120 to display no content in a standby state in which the operator's hand 10 is not in proximity to the operation surface 130A of the touch panel 130.

FIG. 25B depicts the contents displayed when the operator's hand 10 is in proximity to the operation surface 130A of the touch panel 130 in the input device 100C according to the fourth embodiment. As illustrated in FIG. 25B, upon the operator's hand 10 being in proximity to the operation surface 130A of the touch panel 130, the input device 100 causes the display device 120 to display the operation screen 300D for inputting characters. In the example illustrated in FIG. 25B, the operation screen 300D includes the plurality of input keys for inputting characters, and the input keys are arranged in a 3-by-3 matrix. Each of the input keys has a rectangular shape and has the same size. Further, similar to the first embodiment to the third embodiment, the indicator 320 is displayed on the operation screen 300D.

FIG. 25C depicts the contents displayed when one input key of the operation screen 300D is selected by a hover input in the input device 100C according to the fourth embodiment. In the example illustrated in FIG. 25C, an input key 309 having characters "wxyz9" of the operation screen 300D is selected by a hover input. Accordingly, the flick operation screen 300E is displayed near the input key 309. The flick operation screen 300E allows the operator to input any of characters "w", "x", "y", "z", and "9", which are assigned to the input key 309 selected by the hover input, by performing a flick operation.

The operator can input any of the characters "w", "x", "y", "z", and "9" by performing a flick operation on the flick operation screen 300E after the flick operation screen 300E is displayed and until the duration of the hover input reaches a predetermined threshold (in the example illustrated in FIG. 25C, a count of 10).

In a case where a flick operation is not performed and the duration of the hover input reaches the predetermined threshold while the flick operation screen 300E is displayed (that is, in a case where all the scales 321 of the indicator 320 are illuminated), the selection of the input key 309 by the hover input is confirmed.

That is, the operator can visually recognize the amount of remaining time, indicated by the indicator 320, as a period of time during which a flick operation can be performed on the flick operation screen 300E.

As described above, in the input device 100C according to the fourth embodiment, when one input key is selected by a hover input, the display control unit 143 can cause the display device 120 to display the flick operation screen 300E. The flick operation screen 300E allows the operator to selectively input the plurality of characters assigned to the input key by performing a flick operation. Then, if a character is input by performing a flick operation on the flick operation screen 300E, the confirmation unit 144 confirms the input of the character by the flick operation. If no flick operation is performed on the flick operation screen 300E and the duration of the hover input reaches the predetermined threshold, the confirmation unit 144 confirms the selection of the one input key by the hover input.

Accordingly, the input device 100C according to the fourth embodiment allows a plurality of characters to be assigned to one input key and to be selectively input by performing a flick operation, while also allowing the one input key to be selected by a hover input.

Fifth Embodiment

In the following, an input device 100D according to a fifth embodiment will be described. It the following description of the input device 100D according to the fifth embodiment, only the differences from the input device 100 according to the first embodiment will be described.

FIG. 26A through FIG. 26E are diagrams illustrating examples of a selection confirming operation performed by the input device 100D according to the fifth embodiment of the present invention. As illustrated in FIG. 26A through FIG. 26E, the input device 100D according to the fifth embodiment uses a segment display 125 as a "display device configured to display a plurality of selection items".

FIG. 26A depicts a state in which when the operator's hand 10 is not in proximity to the operation surface 130A of the touch panel 130 in the input device 100D according to the fifth embodiment. As illustrated in FIG. 26A, the input device 100D according to the fifth embodiment causes the display device 120 to display no content in a standby state in which the operator's hand 10 is not in proximity to the operation surface 130A of the touch panel 130.

FIG. 26B depicts the contents displayed when the operator's hand 10 is in proximity to the operation surface 130A of the touch panel 130 in the input device 100D according to the fifth embodiment. As illustrated in FIG. 26B, upon the operator's hand 10 being in proximity to the operation surface 130A of the touch panel 130, the input device 100 causes a plurality of input keys arranged in a 3-by-4 matrix to be randomly displayed on the segment display 125. In the example illustrated in FIG. 26B, a plurality of input keys including numbers 0 to 9 are arranged in a 3-by-4 matrix and randomly displayed on the segment display 125, in order to input a personal identification number. Each of the input keys is a digitally displayed character and has the same size.

FIG. 26C depicts the contents displayed when one input key is selected by a hover input in the input device 100D according to the fifth embodiment. In the example illustrated in FIG. 26C, on the operation screen 300D, an input key 341 representing "8" is selected by a hover input. Accordingly, the input key 341 is illuminated more brightly than the other input keys and is thus highlighted.

In the input device 100D, as illustrated in FIGS. 26C, 26D, and 26E, upon the input key 341 being selected by the hover input, the number of illuminated segments of the indicator 320B, provided at the lower left of the segment display 125, gradually increases as the duration of the hover input increases, such that the indicator 320B is formed into a rectangle shape. Then, when the duration of the hover input, performed with respect to the input key 341, reaches a predetermined threshold, all six segments constituting the indicator 320B are illustrated, and the indicator 320B displays "0". Further, when the duration of the hover input, performed with respect to the input key 341, reaches the predetermined threshold, the input device 100D can confirm the selection of the input key 341. Further, if the input key 341 is selected by a touch input before the duration of the hover input reaches the predetermined threshold, the input device 100D can immediately confirm the selection of the input key 341.

As described above, in the input device 100D according to the fifth embodiment, the display control unit 143 can cause an input key selected by a hover input to be illuminated more than the other input keys, such that the selected input key can be highlighted. Accordingly, the input device 100D according to the fifth embodiment allows the operator to readily recognize that the input key is selected by the hover input.

(Example Configuration of Touch Panel 130)

Figure 27:
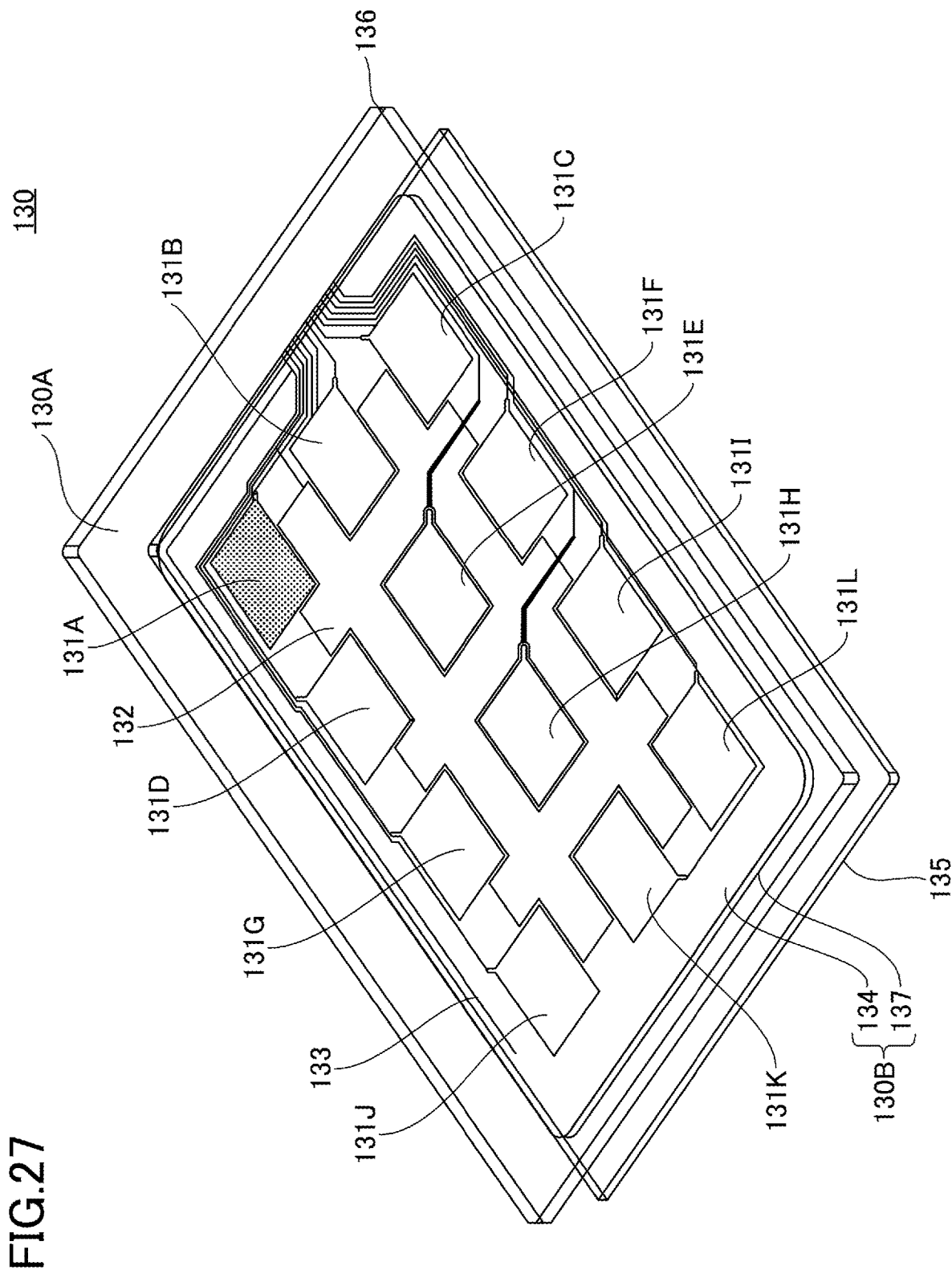
FIG. 27 is a diagram illustrating an example configuration of a touch panel according to an embodiment of the present invention.

FIG. 27 is a diagram illustrating an example configuration of the touch panel 130 according to an embodiment of the present invention. As illustrated in FIG. 27, the touch panel 130 includes a top plate 136, a sensor 130B, and a substrate 135 in the recited order from the top (from the operation surface 130A side) in FIG. 27.

The top plate 136 is a transparent and thin plate-shaped member provided as an uppermost layer of the touch panel 130 (that is, the top plate 136 is provided on the sensor 130B). The top surface of the top plate 136 serves as the operation surface 130A of the touch panel 130. The top plate 136 has a configuration in which a transparent decorative film is attached to the surface of a thin glass plate. The decorative film exhibits a specific surface pattern (such as a wood pattern or a metal pattern) on the surface of the touch panel 130 when the display device 120, provided on the back side of the touch panel 130, is off.

The sensor 130B is provided between the top plate 136 and the substrate 135. The sensor 130B has a configuration in which a sensor film 134 (polyethylene terephthalate film) is disposed on the top surface of a glass plate 137. The sensor film 134 includes touch detection electrodes 131A through 131L, a proximity sensor electrode 132, and a noise detection electrode 133, each of which are formed of a thin film-shaped material having conductivity (e.g., copper foil, a conductive polymer, or the like). Note that an active shield electrode AS is disposed on the bottom surface of the glass plate 137. The active shield electrode AS is driven by the touch panel driver 150 (see FIG. 4) and blocks the supply of an electric current from the touch detection electrodes 131A through 131L and the proximity sensor electrode 132 to the ground, such that capacitances detectable by the touch detection electrodes 131A through 131L and the proximity sensor electrode 132 can be increased.

The touch detection electrodes 131A through 131L are provided in correspondence with the respective input keys. In the example of FIG. 27, the touch detection electrodes 131A through 131L are arranged in a 3-by-4 matrix in correspondence with the respective input keys displayed on the segment display 125 illustrated in FIG. 26A through FIG. 26E. The touch detection electrodes 131A through 131L are configured to detect touch inputs and hover inputs with respect to the respective input keys, based on changes in capacitance.

The proximity sensor electrode 132 is disposed in a relatively large area of the sensor film 134, and is shaped to fill gaps among the touch detection electrodes 131A through 131L. The proximity sensor electrode 132 is configured to detect the proximity of the operation body to the operation surface 130A based on changes in capacitance.

The noise detection electrode 133 is an elongated strip-shaped electrode that extends along the outer periphery of the sensor film 134. The noise detection electrode 133 is configured to detect noise that has entered the touch panel 130.

The substrate 135 is a thin plate-shaped member provided as a lowermost layer of the touch panel 130 (that is, the substrate 135 is provided under the sensor 130B). The sensor 130B is formed on the top surface of the substrate 135. The substrate 135 may be, for example, a printed wiring board (PWB).

Figure 28:
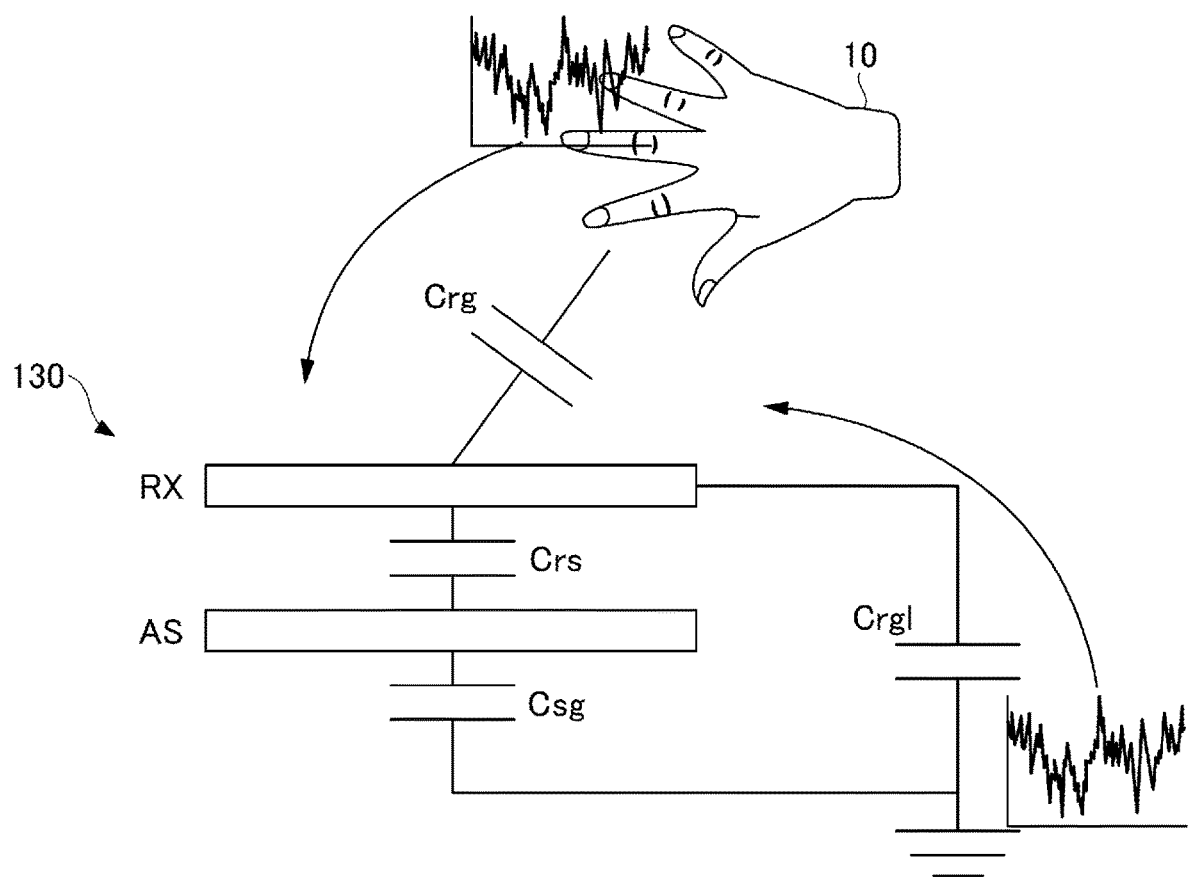
FIG. 28 is a diagram illustrating capacitances formed at the touch panel according to an embodiment of the present invention.

FIG. 28 is a diagram illustrating capacitances formed at the touch panel 130 according to an embodiment of the present invention.

As illustrated in FIG. 28, in the touch panel 130, a capacitance Crg is formed between the operator's hand 10 and each of detection electrodes RX (that is, the touch detection electrodes 131A through 131L, the proximity sensor electrode 132, and the noise detection electrode 133).

Further, in the touch panel 130, a capacitance Crs is formed between each of the detection electrodes RX and the active shield electrode AS.

Further, in the touch panel 130, a capacitance Csg is formed between the active shield electrode AS and the ground.

Further, in the touch panel 130, a parasitic capacitance Crg1 is formed between each of the detection electrodes RX and the ground.

The touch panel 130 can detect the proximity of the operator's hand 10, a hover input, and a touch input with respect to the operation surface 130A by detecting the capacitance Crg formed between each of the detection electrodes RX and the operator's hand 10.

The position, the width, and the length of the noise detection electrode 133 of the touch panel 130 is designed such that Crg of the proximity sensor electrode 132 plus Crg1 of the proximity sensor electrode 132 is equal to Crg of the noise detection electrode 133 plus Crg1 of the noise detection electrode 133. Accordingly, the touch panel 130 is designed such that the proximity sensor electrode 132 and the noise detection electrode 133 are in phase with each other and receive the same amount of noise. Therefore, the touch panel 130 can highly accurately reduce noise by subtracting the output of the noise detection electrode 133 from the amount of change in the proximity sensor electrode 132.

Although specific embodiments have been described above, the claimed subject matter is not limited to the above-described embodiments. Variations and modifications may be made without departing from the scope of the present invention.

What is claimed is:

1. An input device comprising:
   a touch panel having an operation surface and configured to receive a touch input and a hover input by an operation body;
   a display device configured to display a plurality of selection items;
   a memory; and
   a processor coupled to the memory and configured to
      highlight a selection item, a selection of the selection item being made by the hover input from the plurality of selection items,
      cause the display device to display a display object when the hover input is performed, wherein the display object is a frame-shaped display object whose size decreases as a distance between the operation body and the operation surface of the touch panel decreases,
      cause the display device to display a predetermined standby screen in a state in which proximity of the operation body is not detected, cause the display device to display an operation screen in a state in which the proximity of the operation body is detected, the operation screen including the plurality of selection items, and confirm a selection of one selection item among the plurality of selection items in response to: a total number of selection items being included in the frame-shaped display object becoming one.

2. The input device according to claim 1, wherein a range of positions of the operation body for triggering a confirmation of the selection of one selection item is decided based on: a vertical distance between the operation body and the operation surface of the touch panel, and a lateral distance between the operation body and the selection item to be selected.

3. An input device comprising:
a touch panel having an operation surface and configured to receive a touch input and a hover input by an operation body;
a display device configured to display a plurality of selection items;
a memory; and
a processor coupled to the memory and configured to
highlight a selection item, a selection of the selection item being made by the hover input from the plurality of selection items, wherein
the display object is a frame-shaped display object, and a magnification level of an image appearing in the frame-shaped display object increases as a distance between the operation body and the operation surface of the touch panel decreases, and
wherein the processor is configured to
confirm a selection of one selection item in response to a total number of selection items being included in the frame-shaped display object becoming one,
cause the display device to display a predetermined standby screen in a state in which proximity of the operation body is not detected, and
cause the display device to display an operation screen in a state in which the proximity of the operation body is detected, the operation screen including the plurality of selection items.

4. The input device according to claim 3, wherein a range of positions of the operation body for triggering a confirmation of the selection of one selection item is decided based on: a vertical distance between the operation body and the operation surface of the touch panel, and a lateral distance between the operation body and the selection item to be selected.

5. An input device comprising:
a touch panel having an operation surface and configured to receive a touch input and a hover input by an operation body;
a display device configured to display a plurality of selection items;
a memory; and
a processor coupled to the memory and configured to
highlight a selection item, a selection of the selection item being made by the hover input from the plurality of selection items,
confirm the selection of the selection item by the hover input upon a variable reaching a first predetermined threshold, wherein the variable is for counting a first duration of the hover input, and the variable is incrementally increased by a value derived from a constant divided by a distance between the operation body and the operation surface of the touch panel during the first duration, and confirm a selection of the selection item by the touch input in a case where the touch input is detected on the selection item before the first duration reaches the first predetermined threshold.

6. The input device according to claim 5, wherein the processor is configured to cause the display device to display a display object, the display object includes an area representing the first duration, the area gradually increasing as the first duration increases.

7. The input device according to claim 5, wherein the processor is configured to cause the display device to display a display object, the display object includes an area representing the first duration, the area gradually decreasing as the first duration increases.

8. The input device according to claim 5, wherein the processor is configured to confirm the selection of the selection item each time a second duration during which the hover input or the touch input continues reaches a second predetermined threshold, the processor is configured to cause the second predetermined threshold to be different between the hover input and the touch input.

9. The input device according to claim 5, wherein the processor is configured to confirm the selection of the selection item each time a second duration during which the hover input or the touch input continues reaches a second predetermined threshold, and the processor is configured to set the second predetermined threshold to be lower when the selection of the selection item is confirmed for second and subsequent times than when the selection of the selection item is confirmed for a first time.

10. The input device according to claim 5, wherein the processor is configured to highlight the selection item selected by the hover input by causing the selection item selected by the hover input to be illuminated more brightly than other selection items of the plurality of selection items.

11. The input device according to claim 5, wherein the processor is configured to cause the display device to display a predetermined standby screen in a state in which proximity of the operation body is not detected, and cause the display device to display an operation screen in a state in which the proximity of the operation body is detected, the operation screen including the plurality of selection items.

12. The input device according to claim 5, wherein the processor is configured to cause the display device to display an indication that the touch panel is touched in response to the touch input.

13. An input device comprising:
a touch panel having an operation surface and configured to receive a touch input and a hover input by an operation body;
a display device configured to display a plurality of selection items;
a memory; and
a processor coupled to the memory and configured to
highlight a selection item, a selection of the selection item being made by the hover input from the plurality of selection items,
confirm the selection of the selection item by the hover input in a case where a first duration during which the selection item is selected by the hover input reaches a first predetermined threshold, and
confirm a selection of the selection item by the touch input in a case where the touch input is detected on the selection item before the first duration reaches the first predetermined threshold, wherein the processor is configured to disable the selection of the selection item by the touch input in a case where the touch input is detected for a first time after confirming the selection of the selection item by the hover input, and the processor is configured to enable the selection of the selection item by the touch input in a case where the touch input is detected for a second time after confirming the selection of the selection item by the hover input.

14. An input device comprising:
a touch panel having an operation surface and configured to receive a touch input and a hover input by an operation body;
a display device configured to display a plurality of selection items;
a memory; and
a processor coupled to the memory and configured to
highlight a selection item, a selection of the selection item being made by the hover input from the plurality of selection items, and
confirm the selection of the selection item, by
(a) the hover input in a case where a first duration during which the selection item is selected by the hover input reaches a first predetermined threshold, or
(b) the touch input in a ease where the touch input is detected on the selection item before the first duration reaches the first predetermined threshold,
wherein the processor is configured to disable the selection of the selection item by the touch input for a certain period of time after confirming the selection of the selection item by the hover input.

15. The input device according to claim 14, wherein the processor is configured to enable the selection of the selection item by the touch input after a termination of the certain period of time after confirming the selection of the selection item by the hover input.

16. An input device comprising:
a touch panel having an operation surface and configured to receive a touch input and a hover input by an operation body;
a display device configured to display a plurality of selection items;
a memory; and
a processor coupled to the memory and configured to
highlight a selection item, a selection of the selection item being made by the hover input from the plurality of selection items, wherein, in response to the selection item being selected by the hover input, the processor is configured to cause the display device to display a flick operation screen, and the flick operation screen including a plurality of characters, wherein:
in a case where no flick operation is performed on the flick operation screen and the duration reaches a first predetermined threshold, the processor is configured to confirm the selection of a first character among the plurality of characters by the hover input; and
in a case where an input is performed by a flick operation on the flick operation screen, the processor is configured to confirm the selection of a second character among the plurality of characters adjacent to the first character by the flick operation.

17. The input device according to claim 16, wherein the processor is configured to cause the display device to display a display object, the display object includes an area representing the first duration, the area changing in accordance with the first duration, the area gradually increasing as the first duration increases.

18. The input device according to claim 16, wherein the processor is configured to cause the display device to display a display object, the display object includes an area representing the first duration, the area changing in accordance with the first duration, the area gradually decreasing as the first duration increases.

* * * * *